US010970038B2

(12) United States Patent
Swift

(10) Patent No.: US 10,970,038 B2
(45) Date of Patent: Apr. 6, 2021

(54) EFFICIENT DIRECT STORE DELIVERY SYSTEM AND METHODS OF USING THE SAME

(71) Applicant: Hand Held Products, Inc., Fort Mill, SC (US)

(72) Inventor: Brian Swift, Davidson, NC (US)

(73) Assignee: Hand Held Products, Inc., Fort Mill, SC (US)

(*) Notice: Subject to any disclaimer, the term of this patent is extended or adjusted under 35 U.S.C. 154(b) by 112 days.

(21) Appl. No.: 15/724,388

(22) Filed: Oct. 4, 2017

(65) Prior Publication Data

US 2019/0102146 A1 Apr. 4, 2019

(51) Int. Cl.
| G06F 3/16 | (2006.01) |
| G06F 3/0482 | (2013.01) |
| G10L 15/08 | (2006.01) |
| G10L 15/22 | (2006.01) |
| H04M 1/725 | (2021.01) |

(Continued)

(52) U.S. Cl.
CPC ............ *G06F 3/167* (2013.01); *G06F 3/0482* (2013.01); *G06F 16/3329* (2019.01); *G10L 15/08* (2013.01); *G10L 15/22* (2013.01); *H04M 1/72577* (2013.01); *H04W 4/02* (2013.01); *H04W 4/40* (2018.02)

(58) Field of Classification Search
CPC ....... H04W 4/021; H04W 4/029; H04W 4/40; G06F 3/0482; G10L 15/08; G01C 21/343
See application file for complete search history.

(56) References Cited

U.S. PATENT DOCUMENTS

| 7,574,365 B2 | 8/2009 | Miller et al. | |
| 2003/0220835 A1* | 11/2003 | Barnes, Jr. ............... | H04W 4/02 705/14.36 |

(Continued)

FOREIGN PATENT DOCUMENTS

EP 3 001 368 A1 3/2016

OTHER PUBLICATIONS

Direct Store Delivery (DSD) and Route Accounting; Achieving Peak Efficiency to Better Serve Your Customers with Best-In-Class Mobile Technology; Motorola; Printed May 2013; 12 pages.

(Continued)

*Primary Examiner* — Sang H Kim
(74) *Attorney, Agent, or Firm* — Alston & Bird LLP

(57) ABSTRACT

Provided is an improved direct store delivery (DSD) system for providing customized information to a user. The DSD system includes a device that receives a first voice command from the user and determines a current location of the user. The first voice command is then transformed into a first text request based on a conversion of the points in speech to points in data. Further, the first text request is processed to determine a first set of information, based on a current location of the device, to be provided audibly to the user. The first set of information is transmitted to the user through speech. The device further receives a second voice command from the user to interact with the first set of information. The second voice command is processed to determine a final set of information, and the final set of information is visually displayed to the user in an instance in which the user has arrived at a desired location.

20 Claims, 10 Drawing Sheets

(51) Int. Cl.
*G06F 16/332* (2019.01)
*H04W 4/40* (2018.01)
*H04W 4/02* (2018.01)

(56) References Cited

U.S. PATENT DOCUMENTS

| | | | |
|---|---|---|---|
| 2013/0013191 A1* | 1/2013 | Dillahunt | G01C 21/343 |
| | | | 701/423 |
| 2013/0303143 A1* | 11/2013 | Schrader | H04W 12/08 |
| | | | 455/418 |
| 2015/0032366 A1* | 1/2015 | Man | H04W 4/046 |
| | | | 701/412 |
| 2015/0052046 A1 | 2/2015 | Cameron et al. | |
| 2015/0324881 A1* | 11/2015 | Ouimet | G06Q 30/02 |
| | | | 705/14.49 |
| 2016/0042737 A1 | 2/2016 | Emerick et al. | |
| 2016/0125895 A1 | 5/2016 | Gandhi et al. | |
| 2016/0191684 A1 | 6/2016 | DiPiazza et al. | |
| 2016/0203429 A1 | 7/2016 | Mellott et al. | |
| 2017/0124511 A1* | 5/2017 | Mueller | G06Q 10/0837 |
| 2018/0158020 A1* | 6/2018 | Khasis | G01C 21/3453 |

OTHER PUBLICATIONS

In re: DiPiazza; U.S. Appl. titled Distributed Headset with Electronics Module; U.S. Appl. No. 62/097,480, filed Dec. 29, 2014, 19 pages.
In re: DiPiazza; U.S. Appl. titled Tag Mounted Electronics Module for Distributed Headset; U.S. Appl. No. 62/101,568, filed Jan. 9, 2015, 21 pages.

* cited by examiner

EFFICIENT DIRECT STORE DELIVERY SYSTEM AND METHODS OF USING THE SAME

BACKGROUND

The present disclosure relates in general to delivery systems, and, more particularly, to direct store delivery (DSD) systems and methods of using the same.

Companies often utilize their own delivery drivers to deliver goods to customers. The delivery drivers of such "direct store delivery systems" (DSD) are a representative of the particular company, providing an additional point of contact between the customer and the company. Such contact provides another opportunity to the company to present information regarding the company, e.g., services, products, pricing, etc., to the customer. Thus, the delivery driver may advantageously be used to advance future purchasing deals with customers.

Applicant has identified a number of deficiencies and problems associated with conventional direct store delivery systems and associated devices and methods. Through applied effort, ingenuity, and innovation, many of these identified problems have been solved by developing solutions that are included in embodiments of the present invention, many examples of which are described in detail herein.

SUMMARY

The present disclosure relates to techniques and systems for providing customized information to a user during idle dead-time between deliveries when the user is in motion. In an exemplary embodiment, an apparatus for providing customized information to a user is provided. For instance, in some embodiments, the apparatus may be a direct store delivery apparatus for providing customized information to a user for reducing downtime while in route to a desired location. The apparatus may include a microphone for receiving a voice command from the user, and a speaker for transmitting speech to the user. The apparatus may include an interface for visually displaying a set of information to the user. The apparatus may further include a processor in communication with the microphone, speaker, and interface, where the processor can receive a first voice command from the microphone from the user. The processor may further determine whether the apparatus is in transit to the desired location and may determine the presence of a screen lock condition. The processor may transform the first voice command into a first text request by converting one or more audio signals to one or more points in data that are stored in a first database. The processor may further process the first text request to determine a first set of information configured to be transmitted to the user, wherein the first set of information is responsive to the first voice command and is relevant to the desired location. By way of an example, the processor may process the first text request to determine a first set of information based on the desired location of the apparatus. In some embodiments, processing may include transmitting the first text request to a back-end system (e.g., a server) where the first text request is processed and the first set of information is curated from among a variety of data based on, for instance, the requester, the customer, the location data, etc. For instance, the back-end system may contain sales history, sales in the region (what is selling in nearby locations with similar demographics, and using algorithms make suggestions to the user device or apparatus from this back-end system data. Processing to determine a first set of information based on the desired location of the apparatus may occur by the processor itself without obtaining the first set of information from a back-end system. That is, in some embodiments, the sales history, sales in the region (what is selling in nearby locations with similar demographics, etc. may be located onto the apparatus or otherwise immediately accessible to the processor (e.g., through the memory) and using algorithms, the processor may make suggestions for the first set of information.

In some embodiments, the processor may transmit the first set of information to the speaker based on the first voice command when it is determined that the apparatus is in a screen lock condition. In response to the provision of the first set of information to the user, the processor may receive a second voice command to interact with the first set of information from the user. The processor may transform the second voice command into a second text request based on a conversion of the one or more audio signals to one or more points in data that are stored in the database, process the second text request to determine a final set of information to transmit to the user, and may transmit the final set of information to the interface in response to receipt of the second voice command when the processor determines that no screen lock condition is present. The final set of information may be a curated collection of information formed by modifying the first set of information in response to the second voice command.

In some embodiments, processing may include transmitting the second text request to a back-end system (e.g., a server) where the second text request is processed and the final set of information is curated from among a variety of data based on, for instance, the requester, the customer, the location data, etc. For instance, the back-end system may contain sales history, sales in the region (what is selling in nearby locations with similar demographics, and using algorithms make suggestions to the user device or apparatus from this back-end system data. In some embodiments, the final set of information may be visually displayed on the interface in an instance in which the apparatus has arrived at a desired location. In some embodiments, processing and curating the final set of information may occur by the processor on the apparatus itself.

In some embodiments, the final set of information may include information relevant to the desired location, and in some cases, the final set of information may be displayed on the interface in a task list. The second voice command may be configured to interact with the first set of information by at least one of modifying, accepting, or rejecting at least a portion of the first set of information. The first set of information and the final set of information may individually comprise at least one of the following: training, tips, sales, routing information, next stop information, remaining stops information, surveys, suggestions for sales/products, new product information, pricing information, and messages for the delivery driver.

In some embodiments, the processor may be configured to determine whether the apparatus is in transit to the desired location by communicating with one or more sensors configured to determine at least one of the presence of the apparatus in a vehicle, the acceleration of the apparatus, or a current location of the apparatus.

Further, in some further embodiments, the processor, when processing the first text request with the desired location to determine a first set of information configured to be transmitted to the user, the processor may determine one or more points of interest that relate to the desired location by searching the first database or a second database for one or more points in interest relevant to the first text request and the desired location; and curate the first set of information by collecting items of information within the one or more points of interest relevant to the first text request and the desired location. One or more of these actions may be performed at the apparatus itself and/or on a server.

In some embodiments, the screen lock condition may lock the interface to avoid visual display of a set of information in response to the one or more sensors determining that the apparatus is in transit to the desired location. The processor may be configured to determine the presence of the screen lock condition by either placing the interface in a screen lock condition or confirming whether the interface has been placed in the screen lock condition.

In some other embodiments, the sensor may obtain motion data relating to whether the apparatus is in motion, and transmit the motion data to the processor. In some embodiments, the processor may transmit the final set of information to the interface in response to receipt of the second voice command. Further, the final set of information may be visually displayed on the interface in an instance in which the apparatus is not in motion.

The present disclosure further relates to a method of providing customized information to a user. The method may include receiving a first text request from a user, wherein the first text request was formed by transforming a first voice command into the first text request by converting one or more audio signals to one or more points in data that are stored in a database. The method may further include determining whether the user is in transit to a desired location and activating a screen lock condition. The method may also include processing the first text request with the desired location to determine the first set of information, wherein the first set of information is responsive to the first voice command and is relevant to the desired location, and transmitting the first set of information based on the first text request to the user, wherein the first set of information is configured to be provided audibly to the user.

In some embodiments, the first set of information may be provided audibly to the user and the first set of information may be determined based on the received current location of the apparatus. In some embodiments, the first set of information may be determined at least in part on a back-end system (e.g., a server) and/or the user device. The method may further include transmitting the first set of information based on the first voice command through speech and in response, receiving a second text request from the user, wherein the second text request was formed by transforming a second voice command into the second text request by converting one or more audio signals to one or more points in data that are stored in a database, and wherein the second voice command was configured to interact with the first set of information.

The method may further include processing a second text request to determine a final set of information to transmit to the user, wherein the final set of information is a curated collection of information formed by modifying the first set of information in response to the second voice command. In some embodiments, the method may further include deactivating the screen lock condition and transmitting the final set of information to the user in response to receipt of the second text request after deactivating the screen lock condition. In some embodiments, the final set of information may be determined at least in part on a back-end system (e.g., a server) and/or a user device. In some embodiments, the final set of information may be visually displayed to the user in an instance in which the user has arrived at a desired location. Deactivating the screen lock condition may occur after determining whether the user has arrived at the desired location.

In some embodiments, the screen lock condition may be activated by locking an interface available to the user to avoid visual display of a set of information in response to determining that the user is in transit to the desired location. Further, in some embodiments, the second voice command may be configured to interact with the first set of information by at least one of modifying, accepting, or rejecting at least a portion of the first set of information. The first set of information and the final set of information may individually comprise at least one of the following: training, tips, sales, routing information, next stop information, remaining stops information, surveys, suggestions for sales/products, new product information, pricing information, and messages for the delivery driver.

In some embodiments, the final set of information may include information relevant to the desired location.

In some embodiments, when processing the first text request with the desired location to determine a first set of information configured to be transmitted to the user, the processor may determine one or more points of interest that relate to the desired location by searching the first database or a second database for one or more points in interest relevant to the first text request and the desired location; and curate the first set of information by collecting items of information within the one or more points of interest relevant to the first text request and the desired location.

In some embodiments, the method may include determining whether the user is in transit to the desired location, determining points of interest that relate to the desired location, and curating the first set of information based on the points of interest that relate to the desired location.

In some embodiments, the first voice command may have been received via a microphone from the user, and in some embodiments, the first set of information may have been transmitted to the user via a speaker. The first set of information may be configured to be provided audibly to the user by formatting the first set of information such that it can subsequently be provided to a user by speech.

In some embodiments, the method may comprise transmitting a second set of information to the user based on the second voice command; receiving a third text request from the user, wherein the third text request is configured to modify, accept, or reject the second set of information; and processing the third text request to determine the final set of information to transmit to the user, wherein the final set of information is a curated collection of information formed by modifying the first set of information and second set of information in response to the second text request and the third text request.

The present disclosure further relates to a method of providing customized information to a user device. The method may include receiving a first text request from a user device initiated by a first voice command and processing the first text request to determine a first set of information to transmit from a cloud-based system/remote or local application logic to the user device. The first text request may be formed by transforming a first voice command into the first text request by converting one or more audio signals to one or more points in data that are stored in a database and wherein the user device was in a screen lock condition. In some embodiments, processing the first text request may include determining a desired location in which the user device is in transit, determining one or more points of interest that relate to the desired location and the first text request, and curating the first set of information based on the one or more points of interest that relate to the desired location by collecting items of information within the one or more points of interest relevant to the desired location and the first text request. The method may further include transmitting the first set of information to the user device, where the first set of information is provided audibly to the user while the user device is in a screen lock condition. The method may further include, in response to the provision of the first set of information to the user, receiving a second text request from the user device via a second voice command, wherein the second text request is configured to interact with the first set of information; processing the second text request to determine a final set of information to transmit to the user device, wherein the final set of information is a curated collection of information formed by modifying the first set of information in response to the second voice command; and transmitting the final set of information to the user device, wherein the final set of information is visually displayed on an interface when the user device is not in a screen lock condition present. The final set of information to transmit to the user device may be visually displayed on the user device in an instance in which the user device has arrived at the desired location.

In some embodiments, the second voice command may be configured to interact with the first set of information by at least one of modifying, accepting, or rejecting at least a portion of the first set of information. The one or more points of interest may comprise at least one of the following: training, sales, routing information, next stop information, remaining stops information, surveys, suggestions for sales/products, new product information, pricing information, and messages for the delivery driver.

In some embodiments, the method may include receiving location data from the user device, such that, the location data is configured to relate to a current location of a user device, and processing the location data to determine the current location of the user device.

In some embodiments, the method may further include determining a travel route for the user device based on the current location of the user device, and determining the desired location based on the travel route for the user device.

In some embodiments, the method may further include determining additional points of interest that relate to the desired location in response to receiving the second text request, curating a second set of information based on the additional points of interest that relate to the desired location, and transmitting the second set of information to the user device based on the second text request, such that, the second set of information may be provided audibly to the user. Further, in response to the provision of the second set of information to the user, the method may include receiving a third text request from the user device via a third voice command, such that, the third text request may interact with the second set of information, and processing the third text request to determine the final set of information to transmit to the user device.

The above summary is provided merely for purposes of summarizing some example embodiments illustrating some aspects of the present invention. Accordingly, it will be appreciated that the above-described embodiments are merely examples and should not be construed to narrow the scope or spirit of the invention in any way. It will be appreciated that the scope of the invention encompasses many potential embodiments in addition to those herein summarized, some of which will be further described below.

BRIEF DESCRIPTION OF THE DRAWINGS

The accompanying drawings illustrate embodiments of the invention, and, together with the specification, including the general description above and the detailed description which follows, serve to explain the features of the present invention.

DETAILED DESCRIPTION

Figure 1:
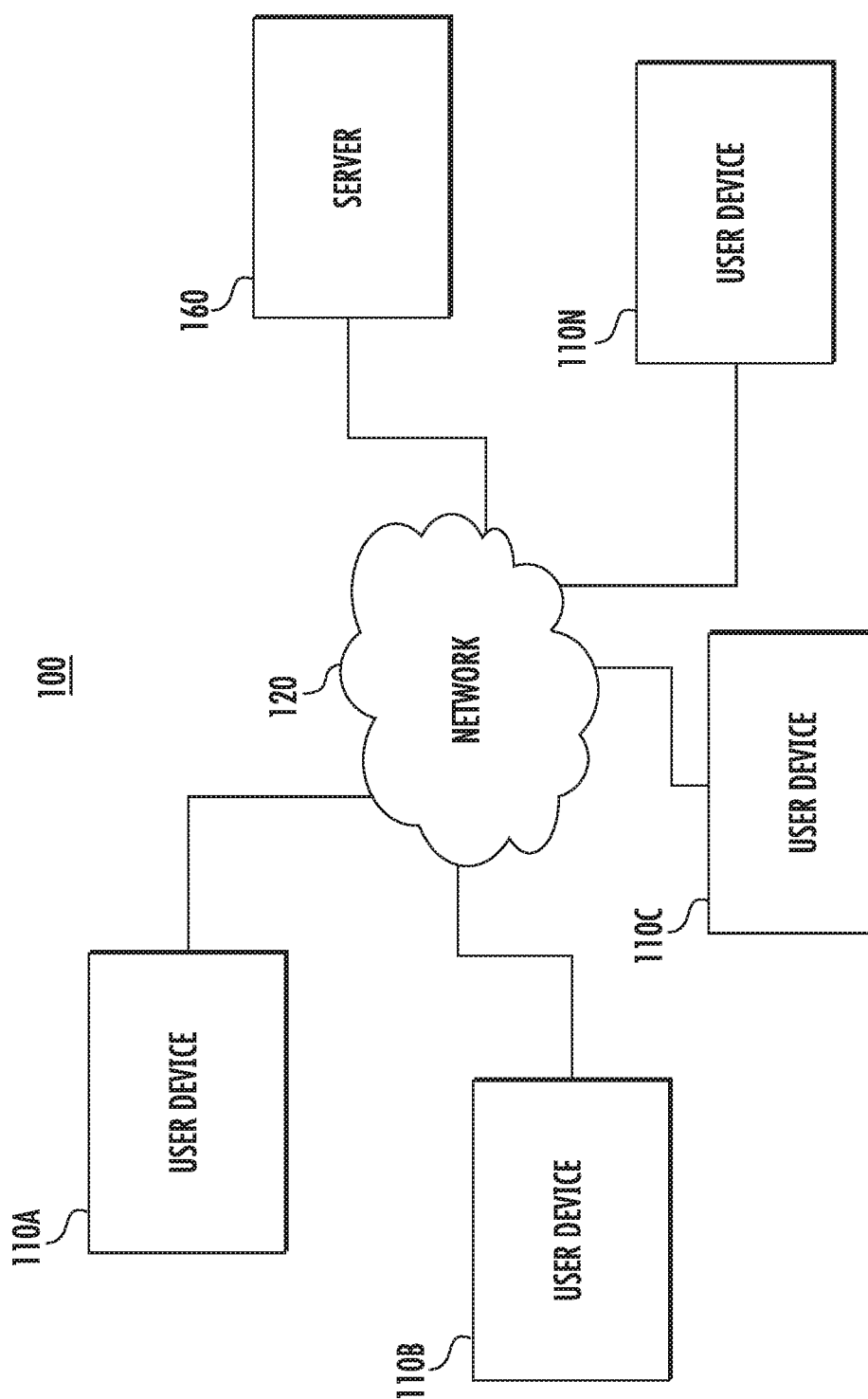
FIG. 1 illustrates a schematic of a direct store delivery system (DSD) according to an example embodiment.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," "outside," "inside," etc. are used for explanatory purposes in the examples provided below to describe the relative position of certain devices or portions of devices. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "transmitter" refers to any component that can generate radio waves for communication purposes while a "receiver" is used to generally refer to any component that can receive radio waves and convert the information into useable form. A "transceiver" generally refers to a component that can both generate radio waves and receive radio waves and is thus contemplated when either a transmitter or a receiver is discussed.

The term "processor" is used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory can also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device and memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, tablets, headsets, and smartwatches are generally collectively referred to as mobile devices. For instance, the computing device may be a DOLPHIN™ 75e or a VOCOLLECT™ Talkman.

The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The present disclosure relates to an apparatus and a method for providing customized information to a user. As described above, in a direct store delivery (DSD) environment, companies often employ delivery drivers to deliver goods directly to the customers. This presents an opportunity for the company to present information regarding the company, e.g., services, products, pricing, etc., to the customer through the delivery drivers. Further, each customer, such as a retail store, may have different preferences and interests, and it may be desirable to present customer specific data, such as offers, services, and the like, to the customer at each delivery location. In this regard, it is highly beneficial for a set of information to be presented at each delivery location to be customized beforehand, which may be time-consuming and an extensive process, as a delivery driver may make multiple delivery stops in a day. Further, the delivery drivers often carry a communication device, such as, a mobile device, and/or the delivery vehicle may have an in-built communication interface, to enable the delivery drivers to communicate with a server, workflow management system, warehouse, store managers, other delivery drivers, and the like. For example, a communication device carried by a delivery driver may have a display to provide workflow related tasks, such as, the next delivery location, to the delivery driver. The communication device may further have an input module to receive any input from the delivery driver. However, interacting with a communication device, such as checking the display screen, while driving is distracting, often illegal, and may pose a safety threat to the delivery drivers. Hence, most companies prohibit the delivery drivers from using a communication device while the delivery vehicle is in motion, thus, resulting in an idle and unproductive time between deliveries. For example, when a delivery driver is driving towards a delivery location, the delivery driver may be required to keep a display screen of a mobile device locked while the vehicle is in motion, resulting in dead-time between stops.

The present disclosure aims at utilizing the dead-time effectively, while adhering to safety requirements, and may provide valuable customized information quickly and efficiently to the user. The method disclosed herein describes using audio data, such as, speech input signals and/or voice commands to facilitate communication between a user, such as a delivery driver, and an apparatus, such as a communication device. The method may include receiving a first voice command from the user, determining a current location of the user, processing the first voice command to determine a first set of information to transmit to the user by, for example, transforming the first voice command into a first text request based on a conversion of one or more audio signals to points in data, and processing the first text request to determine points of interest related to a desired location and determine the first set of information. The points in data may be stored on a database that may be on the apparatus and/or a server. For example, an apparatus, such as a mobile device carried by a delivery driver and/or a vehicle communication device, may receive a first voice command from the delivery driver requesting information from the apparatus. The apparatus may process the first voice command and determine a first set of information to present to the delivery driver. The determination of a first set of information may include processing by the apparatus and/or a back-end server. The points of interest may include various topics such as training, sales, routing information, next stop information, remaining stops information, surveys, suggestions for sales/products, new product information, pricing information, and messages for the delivery driver. The set of information may then be more specific information ("items of information") such as certain training modules, tips, sales performance, next stop information (e.g., products to be delivered and how many, special requirements/procedures/ interests of the next stop), remaining stops information, surveys, suggestions for sales/products (e.g., complimentary products, related products), new product information (e.g., statistics, competitor information), pricing information, messages for the delivery driver, etc., and may be a combination or compilation of such information. The delivery driver may interact with the set of information by providing responses or requests to change/modify/add to/combine the set of information. A final set of information including the changes/modifications/additions/combinations of the set of information may then be presented to the user thereby providing a customized, curated list of information. For example, the delivery driver may add to the above information, change any of the above information, or combine any of the above information to curate a final set of information that the driver can then use at the next stop.

While driving, the user or delivery driver may be prevented from accessing and using the interface or screen. The device may impose a "screen lock condition" on the device such that the driver is prevented from accessing and interacting with the visual display. Thus, instead of visually displaying sets of information to the driver, while driving, the device interacts with the driver solely by voice. A screen lock condition locks the interface to avoid visual display of a set of information. Such condition may be in response to the processor determining that the apparatus is in transit to a desired location. For instance, the processor may communicate with one or more sensors to determine that the apparatus is in transit to the desired location. One or more sensors may determine the presence of the apparatus in a vehicle, determine the acceleration of the apparatus, or determine a current location of the apparatus.

By way of an example, the first voice command may include a command to determine offers, services, and/or other information to be presented to a customer at a next delivery location. The apparatus may then determine a current location or desired location of the delivery driver. For instance, based on the current location, the apparatus may determine the next delivery location, based on, for example, accessing a delivery schedule from a server. Further, the apparatus may use the location information and customer data corresponding to the next delivery location and determine a first set of information. By way of an example, the first set of information may include a list of offers, services, and/or other information that may be presented to the customer at the delivery location.

In accordance with some embodiments disclosed herein, the method may further include transmitting the first set of information based on the first voice command through speech and in response to receiving a second voice command from the user, such that the second voice command interacts with the first set of information, processing the second voice command to determine a final set of information to transmit to the user. The second voice command may be transformed into a second text request by converting one or more audio signals to one or more points in data that are stored in a first database. The database may be on the apparatus and/or a server. Processing may take place at the apparatus and/or a back-end server. By way of the above example, the list of offers, services, and/or other information (e.g., sales information for the customer or competitors of the customer) may be presented audibly to the delivery driver through a speaker of the mobile device and/or the vehicle communication device. In response, the mobile device and/or the vehicle communication device may receive a second voice command from the delivery driver. By way of an example, the second voice command may include a response, such as "Accept," "Reject," "Next", to accept or reject one or more offers, services, and/or information from the presented list. The response may be received via a microphone of the mobile device and/or the vehicle communication device. In response, the mobile device, the vehicle communication device, and/or server may modify the presented list and curate a final set of information to be presented to the delivery driver. For instance, the apparatus and/or back-end system may contain sales history, sales in the region (what is selling in nearby locations with similar demographics, and using algorithms make suggestions. For example, the final set of information may include one or more offers, services, and/or other information accepted by the delivery driver as being relevant to the customer at the next delivery location. In some embodiments, the final set of information may be visually displayed, on the mobile device and/or the vehicle communication device, to the delivery driver when the delivery driver has arrived at a desired location and/or it is determined that no screen lock condition is present.

The components illustrated in the figures represent components that may or may not be present in various embodiments of the invention described herein such that embodiments may include fewer or more components than those shown in the figures while not departing from the scope of the invention.

While the present disclosure focuses on direct store delivery systems, one or more embodiments of the present disclosure may be used for other purposes or in other environments, such as to connect employees in a warehouse, retail store, office building, etc. The present disclosure may be particularly beneficial when it is desired to connect remote users or provide access to information to remote users.

FIG. 1 shows a system 100 including an example network architecture for a system, which may include one or more devices and sub-systems that are configured to implement some embodiments discussed herein. For example, system 100 may include a server 160, which can include, for example, the circuitry disclosed in FIGS. 2-4, a server, or database, among other things (not shown). The server 160 may include any suitable network server and/or other type of processing device. In some embodiments, the server 160 may receive requests and transmit information or indications regarding such requests to user devices 110A-110N.

The term "text request" as used herein may refer to the converted form of a voice command from a user and/or a user device, the voice command requesting information and/or data from a server, user device, and/or a database or providing information and/or data to a server, user device, and/or a database. The text request may be formed by converting audio signals of the voice command from a user device to points in data that are stored in a database and can be interpreted by the processor to determine the meaning of the voice command. By way of an example, a user may provide a voice command to a user device 110A-110N requesting a list of offers, services, product/sales information, and the like, to be presented to a customer at a delivery location in a direct store delivery (DSD) system. The user device 110A-110N may parse and process the voice command and transform the voice command into a text request for the user device 110A-110N to process and/or for a server 160 to process. The text request may indicate the information requested by the user, in the form of, say, fields in a request message. In response, the user device 110A-110N and/or server 160 may fetch and/or generate the requested data and respond with a set of information to the user and/or the user device 110A-110N.

The term "set of information" as used herein may refer to a data and/or information provided to a user and/or a user device by a server, database, and/or any other device in a system. In some cases, the set of information may be provided in response to a text request (or voice command), as described above, by a user and/or a user device. The set of information may be provided through an interface, such as, but not limited to, a speaker, display, etc., of a user device and/or any other device in the system. The set of information may be provided to a user as a speech signal, visually displayed data, printed data, and/or through any other output means. The set of information may include various information, such as training modules, tips, sales performance, next stop information (e.g., products to be delivered and how many, special requirements/procedures of the next stop), remaining stops information, surveys, suggestions for sales/products, new product information (e.g., statistics, competitor information), pricing information, messages for the delivery driver, etc. For example, in response to the request received from the user device 110A-110N, the user device 110A-110N and/or server 160 may provide a collated list of services, offers, products/sales information, etc., to be presented to the customer at the delivery location. In some cases, the server 160 and/or the user device 110A-110N may determine relevant services, offers, and/or products/sales information from a list of all available services, offers, and/or products/sales information based on customer data, current location, and/or any other factor. In some cases, a user may be in the process of making a next stop and the intelligent traffic routing of the user device 110A-110N and/or server 160 may identify a better next stop to take given the new routing which will take them by another stop, with intent to go to the original intended next stop after this alternative second stop. In such cases, the user device 110A-110N and/or server 160 may re-evaluate the product offers, sales etc. in view of this alternative stop. The set of information specific to the original next step may be cached for use as the stop after the alternative stop. Various modifications may be available for the present system. Thus, the set of information provided to the user and/or the user device 110A-110N may include customized information from a larger available dataset based on customer specific data and location data.

As described above, the server 160 can communicate with one or more user devices 110A-110N via a network 120. In this regard, network 120 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 120 may include a cellular telephone, an 802.11, 802.16, 802.20, and/or WiMax network. In some embodiments, Bluetooth may be used to communicate between devices. Further, the network 120 may include a public network, such as the Internet, a private network, such as an intranet, or combinations thereof, and may utilize a variety of networking protocols now available or later developed including, but not limited to TCP/IP based networking protocols.

User devices 110A-110N and/or server 160 may each be implemented as a computing device, such as a personal computer and/or other networked device, such as a cellular phone, tablet computer, mobile device, point of sale terminal, inventory management terminal, vehicle communication system etc., that may be used for any suitable purpose in addition to presenting the interface to facilitate buying items and/or offering items for sale. The depiction in FIG. 1 of "N" members is merely for illustration purposes. Any number of users may be included in the system 100. In one embodiment, the user devices 110A-110N may be configured to display an interface on a display of the user device for viewing, creating, editing, and/or otherwise interacting with the server. According to some embodiments, the server 160 may be configured to display the interface on a display of the server 160 for viewing, creating, editing, and/or otherwise interacting with information on the server 160. In some embodiments, an interface of a user device 110A-110N may be different from an interface of a server 160. The user devices 110A-110N may be used in addition to or instead of the server 160. System 100 may also include additional member devices and/or servers, among other things.

Figure 2:
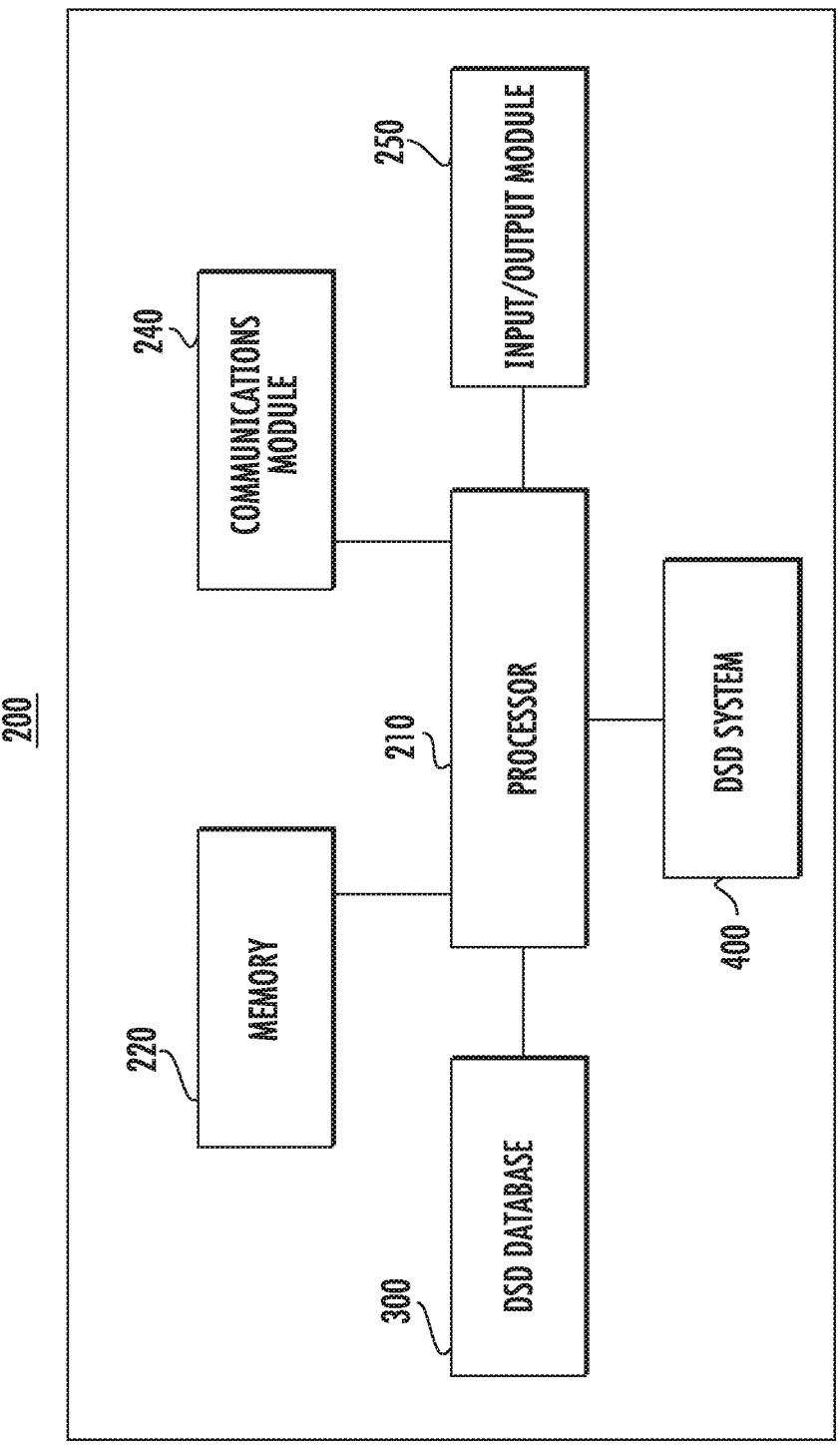
FIG. 2 illustrates a schematic block diagram of a direct store delivery system according to an example embodiment.

FIG. 2 shows a schematic block diagram of circuitry 200, some or all of which may be included in, for example, server 160 and/or user devices 110A-110N. Any of the aforementioned systems or devices may include the circuitry 200 and may be configured to, either independently or jointly with other devices in a network 120 perform the functions of the circuitry 200 described herein. As illustrated in FIG. 2, in accordance with some example embodiments, circuitry 200 can includes various means, such as processor 210, memory 220, communications module 240, and/or input/output module 250. In some embodiments, DSD database 300 and/or DSD system 400 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 220) that is executable by a suitably configured processing device (e.g., processor 210), or some combination thereof.

Processor 210 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 210 comprises a plurality of processors. The plurality of processors may be embodied on a single computing device or may be distributed across a plurality of computing devices collectively configured to function as circuitry 200. The plurality of processors may be in operative communication with each other and may be collectively configured to perform one or more functionalities of circuitry 200 as described herein. In an example embodiment, processor 210 is configured to execute instructions stored in memory 220 or otherwise accessible to processor 210. These instructions, when executed by processor 210, may cause circuitry 200 to perform one or more of the functionalities of circuitry 200 as described herein.

Whether configured by hardware, firmware/software methods, or by a combination thereof, processor 210 may comprise an entity capable of performing operations according to embodiments of the present invention while configured accordingly. Thus, for example, when processor 210 is embodied as an ASIC, FPGA or the like, processor 210 may comprise specifically configured hardware for conducting one or more operations described herein. Alternatively, as another example, when processor 210 is embodied as an executor of instructions, such as may be stored in memory 220, the instructions may specifically configure processor 210 to perform one or more algorithms and operations described herein, such as those discussed in connection with FIGS. 1-9.

Memory 220 may comprise, for example, volatile memory, non-volatile memory, or some combination thereof. Although illustrated in FIG. 2 as a single memory, memory 220 may comprise a plurality of memory components. The plurality of memory components may be embodied on a single computing device or distributed across a plurality of computing devices. In various embodiments, memory 220 may comprise, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. Memory 220 may be configured to store information, data (including item data and/or profile data), applications, instructions, or the like for enabling circuitry 200 to carry out various functions in accordance with example embodiments of the present invention. For example, in at least some embodiments, memory 220 is configured to buffer input data for processing by processor 210. Additionally or alternatively, in at least some embodiments, memory 220 is configured to store program instructions for execution by processor 210. Memory 220 may store information in the form of static and/or dynamic information. This stored information may be stored and/or used by circuitry 200 during the course of performing its functionalities.

Communications module 240 may be embodied as any device or means embodied in circuitry, hardware, a computer program product comprising computer readable program instructions stored on a computer readable medium (e.g., memory 220) and executed by a processing device (e.g., processor 210), or a combination thereof that is configured to receive and/or transmit data from/to another device and/or network, such as, for example, a second circuitry 200 and/or the like. In some embodiments, communications module 240 (like other components discussed herein) can be at least partially embodied as or otherwise controlled by processor 210. In this regard, communications module 240 may be in communication with processor 210, such as via a bus. Communications module 240 may include, for example, an antenna, a transmitter, a receiver, a transceiver, network interface card and/or supporting hardware and/or firmware/software for enabling communications with another computing device. Communications module 240 may be configured to receive and/or transmit any data that may be stored by memory 220 using any protocol that may be used for communications between computing devices. Communications module 240 may additionally or alternatively be in communication with the memory 220, input/output module 250 and/or any other component of circuitry 200, such as via a bus.

Input/output module 250 may be in communication with processor 210 to receive an indication of a user input and/or to provide an audible, visual, mechanical, or other output to a user (e.g., employee and/or customer). Some example visual outputs that may be provided to a user by circuitry 200 are discussed in connection with FIGS. 1-9. As such, input/output module 250 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 200 is embodied as a server or database, aspects of input/output module 250 may be reduced as compared to embodiments where circuitry 200 is implemented as an end-user machine (e.g., remote worker device and/or employee device) or other type of device designed for complex user interactions. In some embodiments (like other components discussed herein), input/output module 250 may even be eliminated from circuitry 200. Alternatively, such as in embodiments wherein circuitry 200 is embodied as a server or database, at least some aspects of input/output module 250 may be embodied on an apparatus used by a user that is in communication with circuitry 200. Input/output module 250 may be in communication with the memory 220, communications module 240, and/or any other component(s), such as via a bus. One or more than one input/output module and/or other component can be included in circuitry 200.

The DSD database 300 and the DSD system 400 may also or instead be included and configured to perform the functionality discussed herein related to direct store delivery. In some embodiments, some or all of the functionality of generating information for direct store delivery may be performed by processor 210. In this regard, the example processes and algorithms discussed herein can be performed by at least one processor 210, DSD database 300, and/or DSD system 400. For example, non-transitory computer readable media can be configured to store firmware, one or more application programs, and/or other software, which include instructions and other computer-readable program code portions that can be executed to control each processor (e.g., processor 210, DSD database 300, and/or DSD system 400) of the components of circuitry 200 to implement various operations, including the examples shown above. As such, a series of computer-readable program code portions are embodied in one or more computer program goods and can be used, with a computing device, server, and/or other programmable apparatus, to produce machine-implemented processes.

Figure 3:
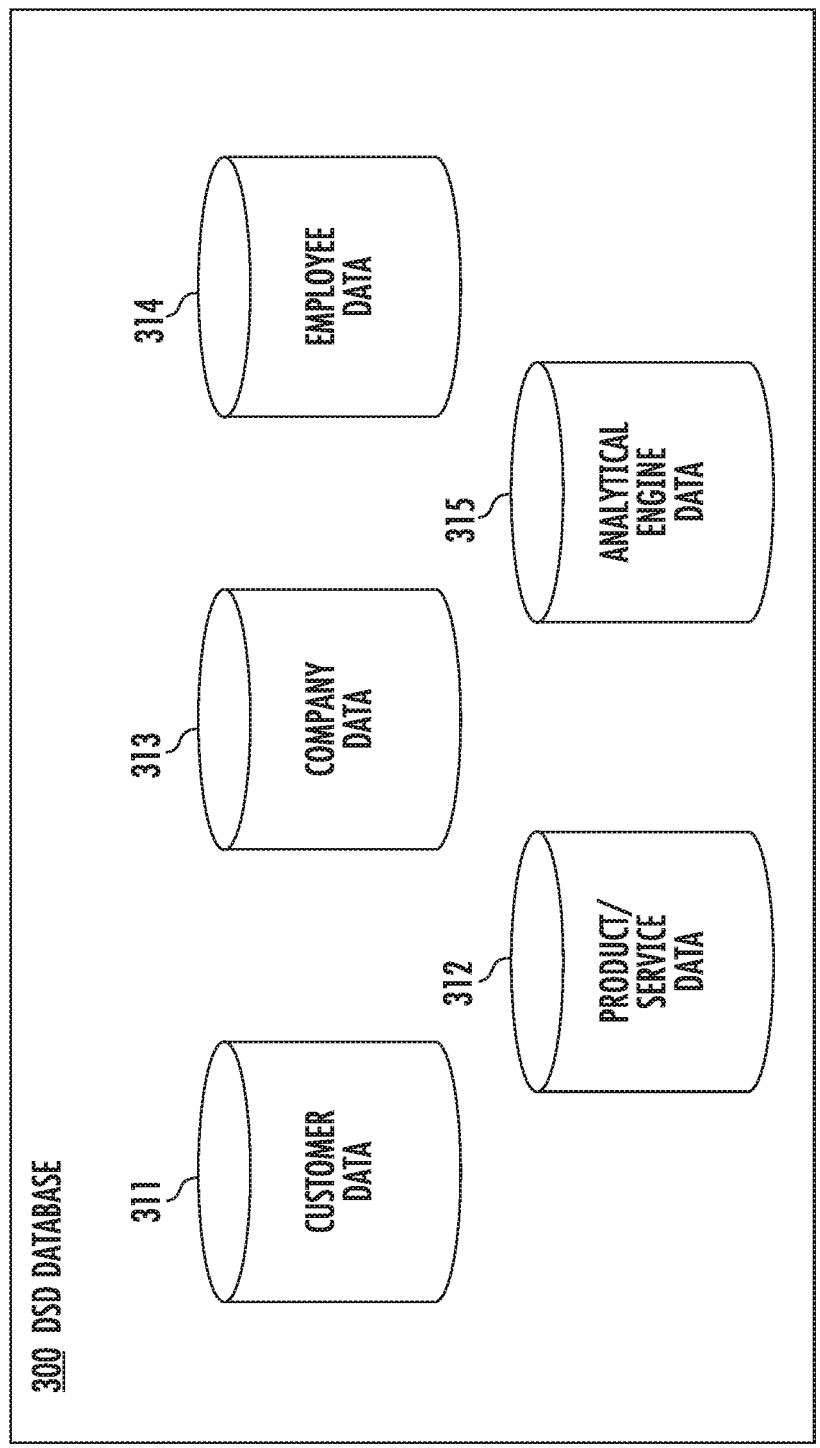
FIG. 3 illustrates a schematic block diagram of a DSD database according to an example embodiment.

In some embodiments, a DSD database 300 may be provided that includes various relevant information for direct store delivery. For instance, as shown in FIG. 3, in this embodiment, the DSD database 300 includes customer data 311, product/service data 312, company data 313, and employee data 314. Various other data may be included in the DSD database 300. In accordance with one or more embodiments of the present disclosure, the customer data 311 may include data related to all customers, related to a specific customer associated with a delivery location, related to customers to be serviced by the user in a day, and the like.

By way of an example, customer data 311 may include information related to customer needs; area of interest, weakness, and/or dominance; previous transactions; historical data (e.g., sales history such as sales unit deficits for this location against plan (e.g., the customer is not selling to plan or in line with above average sales being observed for certain products at nearby/similar locations)); relationship data; previous offers, services, and/or products/sales information that the customer was interested in; customer value and/or profitability, etc.

Further, in accordance with one or more embodiments of the present disclosure, the product/service data 312 may include data related to the products and/or services offered by the direct store delivery system. By way of an example, product/service data 312 may include information on available products and/or services; current offers/promotions on products and/or services; products, sales information, services, and/or offers that may be desirable to a specific customer, etc. Further, in some cases, the product/service data 312 may include data on product availability. For example, if there is additional and/or spare product in the delivery vehicle, the product may be indicated as readily available and may be offered to the customer for immediate handover. The product/service data 312 may also include data related to a product's shelf life and the average delivery times associated with the product.

Further, in accordance with one or more embodiments of the present disclosure, the company data 313 may include data related to a company registered with the direct store delivery system as a supplier. For example, the company data may include, but is not limited to, company profile, company's targeted market, competitors, company's dominance and/or standing in an area and what products/services may help them improve their business, historical data, and the like.

Further, the employee data 314 may include data related to employees of a customer, such as a store manager, prior experience in dealing with the employee, employee rank and decision making authority, preferred delivery time based on preferred employees, products and/or offers that a specific employee is generally interested in, information on how to present a new product and/or service to a specific employee, such as, if the employee prefers brochures, samples, sales data, and the like. In some embodiments, the employee data 314 may include various information related to the particular delivery driver or other employee of the supplier, such as the employee's sales information, rank and decision making authority, product and/or location expertise, etc.

As additional direct store deliveries are made, the system 200 may receive additional information regarding customers, the company itself, and the relevant employee (e.g., sales information), which may be stored in the DSD database 300. In addition, as additional information is developed regarding products and/or services provided by the company, the system 200 may receive this additional information and store the information in the DSD database 300 for future use. Additionally or alternatively, the DSD database 300 may include analytical engine data 315 which provides any additional information needed by the DSD system 400 in analyzing inputs and requests and generating the appropriate response.

For example, DSD system 400 can be configured to analyze multiple sets of data (e.g., including various combinations of customer data, product data, company data, employee data, etc.), such as the data in the DSD database 300. In this way, DSD system 400 may support multiple algorithms, including those discussed herein with respect to customer data, product data, employee data, etc., so that the selected algorithm may be chosen at runtime. Further, the present configuration can enable flexibility in terms of configuring additional contexts. For example, the DSD system 400 may analyze the remaining inventory in the delivery truck and determine optimal distribution points for the inventory. For instance, the DSD system 400 may determine that the delivery truck contains loads of popcorn left in the truck and that customer A is behind the plan in popcorn unit sales even though nearby stores have been selling more popcorn, or showing a strong demand for popcorn. Thus, the DSD system 400 will suggest what stores should overstock popcorn.

Figure 4:
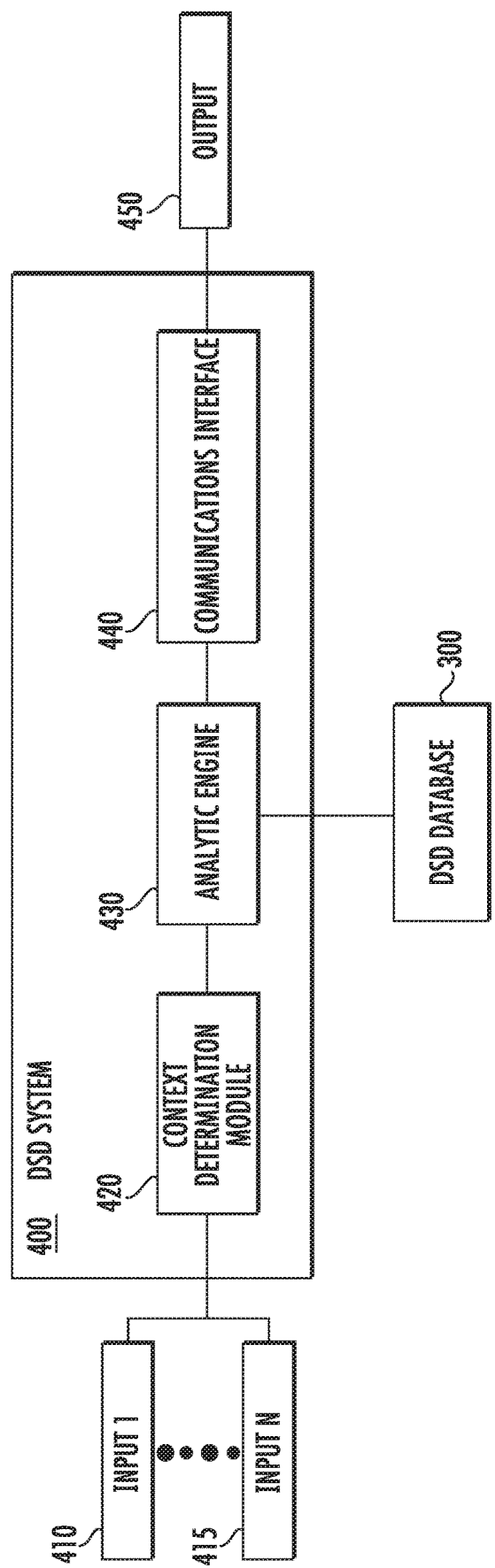
FIG. 4 illustrates a schematic block diagram of a DSD system according to an example embodiment.

In some embodiments, with reference to FIG. 4, the DSD system 400 may include a context determination module 420, analytical engine 430, and communications interface 440, all of which may be in communication with the DSD database 300. The DSD system 400 may receive one or more inputs (e.g., voice commands directly or text requests after conversion of audio signals) and may generate an appropriate response. The DSD system 400 may use any of the algorithms or processes disclosed herein for receiving an input and generating a response. In some other embodiments, such as when the circuitry 200 is embodied in a server 160 and/or user devices 110A-110N, the DSD system 400 may be located in another circuitry 200 or another device, such as another server 160 and/or user devices 110A-110N.

The DSD system 400 can be configured to access data corresponding to one or more customers and products/services, and generate one or more responses and/or indications.

With reference to FIG. 4, whether used locally or over a network, the DSD system 400 may be used to generate requested information or responses. The system may receive a plurality of inputs 410, 415 from the circuitry 200 and process the inputs within the DSD system 400 to produce an output 450. In some embodiments, the DSD system 400 may execute context determination module 420, process the data in an analytical engine 430, and output the results via the communications interface 440. Each of these steps may pull data from a plurality of sources including the DSD database 300.

When inputs 410, 415 are received by the channeling system 400, a context determination using context determination module 420 may first be made. A context determination includes such information as customer data (e.g., what customer is associated with the input 410, 415), employee data (e.g., what employee is associated with the input 410, 415), product data (e.g., what product is associated with the input 410, 415), preference data of the system, and what request or indication was received as the input 410, 415. These inputs may give context to the DSD system's 400 analysis to determine the output. For example, the context determination module 420 may inform the DSD system 400 as to what response is appropriate.

The DSD system 400 may then analyze the inputs 410, 415 using the analytical engine 430. The analytical engine 430 draws information about the customer, employee, product, and/or company etc. from the DSD database 300 and then, in light of the context determination module's 420 determination, computes an appropriate response. In some embodiments, the inputs 410, 415 received by the DSD system 400 may include text requests directly for providing information from a server and/or a database. In some embodiments, the inputs 410, 415 received by the DSD system 400 may include voice commands that are then transformed into points in data stored in the DSD database 300. The points in data form the text requests that can be processed by the DSD system 400. The conversion of the audio signals to points in data may occur in the DSD system 400 or may occur on a system or software in communication with the DSD system 400. In some embodiments, the inputs 410, 415 received by the DSD system 400 may include requests or commands to accept and/or modify a set of information provided by the DSD system 400. By way of an example, the inputs 410, 415 may include a voice command, such as "NEW PRODUCTS FOR NEXT CUSTOMER" requesting a list of new products that may be of interest to a customer at a next delivery location or "PRODUCTS TO BE DELIVERED TO NEXT CUSTOMER" requesting a list of products that are to be delivered to the customer at the next delivery location. The DSD system 400 may further receive a location data, from a sensor, such as a GPS receiver, indicating a current location of the user device 110A-N. The DSD system 400 may further receive a motion data, from a sensor, such as an accelerometer, indicating that the user and/or the user device 110A-N may be in motion. The processor 210 and/or the DSD system 400 may receive an indication from one or more sensors that the user device is relocated in the vehicle (which indicates that the vehicle will be in transit), or receive the current location from one or more sensors, which can then be used to determine the desired location or destination of the user device/delivery driver. The processor 210 and/or the DSD system 400 may further access a travel route associated with the user device 110A-N. In an embodiment, the travel route may be a pre-determined delivery schedule with a map to all delivery locations. The processor 210 and/or the DSD system 400 may obtain the travel route from the server 160 and/or a database and correlate the motion data and the location data to the travel route to determine that the next customers may be customer A. The processor 210 and/or the DSD system 400 may further determine a location corresponding to customer A from a server, a database, and/or based on the travel route.

The DSD system 400 may determine whether the user is in transit to a desired location such as a customer location. The DSD system 400 may lock the screen of a user device or an interface in which the system is in communication with and the user has access to. Such locking mode or "screen lock condition" may be activated by the DSD system 400 as a safety precaution while the user is driving (e.g., determined by determining that the user device is accelerated or in motion, determining the current location of the user device, or determining that the device has been relocated back to the vehicle). The DSD system 400 may deactivate the screen lock condition when it is determined that the condition is no longer needed (e.g., the user is no longer driving).

The context determination module 420 may then obtain data, such as customer data, employee data, and/or products data, related to customer A, as a set of information to be provided to the user. By way of the above example, the DSD system 400 may provide a list of new products that may be of interest to customer A to the user as a speech signal and/or an audio message. In response, the user device may receive further inputs 410, 415 from the user. By way of an example, the inputs 410, 415 may include a voice command, such as "ACCEPT" "DECLINE", provided by the user in response to receiving the list of new products for customer A, accepting and/or rejecting one or more new products from the list. Thus, the DSD system 400 may modify the list of new products based on the inputs 410, 415 and may provide the final list of new products to be offered to customer A to the user when the user arrives at the delivery location associated with the customer A. One or more of these actions may be performed on the user device and/or server.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 210, DSD database 300, and/or DSD system 400 discussed above with reference to FIG. 2, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 220) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

The user devices 110A-110N and/or server 160 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, the user devices 110A-110N and/or server 160 may include one or more output devices, including but not limited to a display, a speaker, a haptic feedback mechanism, a printer, lights, any other mechanism capable of presenting an output to a user, or any combination thereof.

The user devices 110A-110N and/or server 160 may include components for monitoring and/or collecting information regarding the user or external environment in which the component is placed. For instance, the user devices 110A-110N and/or server 160 may include sensors, scanners, and/or other monitoring components. In some embodiments, scanners may be used to determine the presence of certain individuals or items. For example, in some embodiments, the components may include a scanner, such as an optical scanner, RFID scanner, and/or other scanner configured to read human and/or machine readable indicia physically associated with an item.

Figure 5:
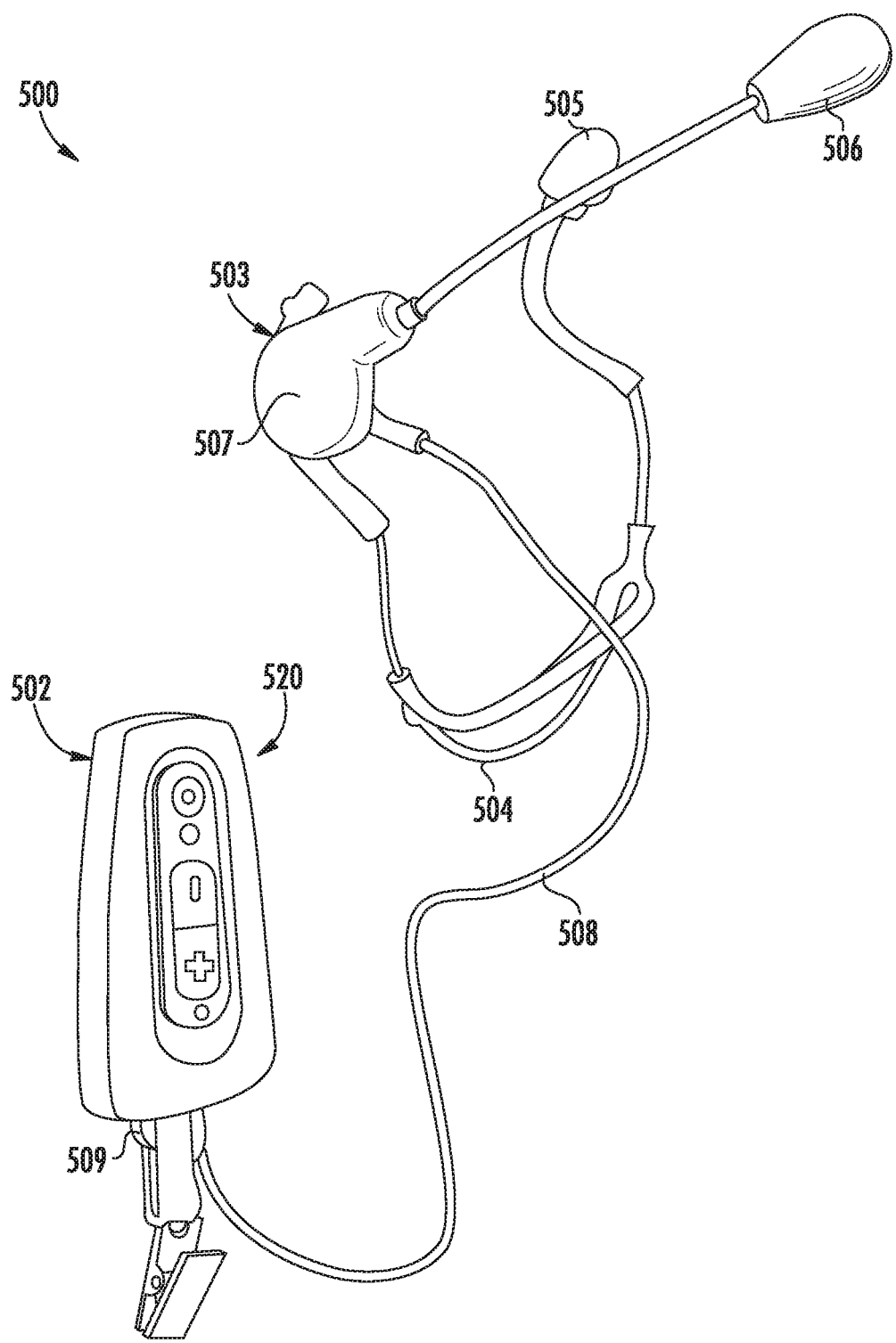
FIG. 5 illustrates an exemplary user device according to an example embodiment.

FIG. 5 illustrates an exemplary user device according to an example embodiment. In the embodiment illustrated in FIG. 5, the user device 500 is a headset that includes a wireless enabled voice recognition device that utilizes a hands-free profile. As noted above, in some embodiments, the user device, including one or more microphones and one or more speakers as well as one or more of the components further described below, may be a vehicle communication device integrated and/or attached to the vehicle. In such embodiments, the user may interact with the vehicle communication device without needing to wear a headset. Further, in some embodiments, the vehicle communication device may interact with a headset, such as a Bluetooth earpiece, such that the various functions of the system are performed by the vehicle communication device and/or the headset.

In one embodiment, the headset may be substantially similar to the headset disclosed in U.S. Provisional Patent Application No. 62/097,480 filed Dec. 29, 2014, U.S. Provisional Patent Application No. 62/101,568, filed Jan. 9, 2015, and U.S. patent application Ser. No. 14/918,969, and the disclosures therein are hereby incorporated by reference in their entireties.

In the embodiment illustrated in FIG. 5, the user device 500 includes an electronic module 502, which may incorporate various components of the circuitry 200. In this embodiment, elements are incorporated into an electronics module 502 rather than the headset 503, to provide a long battery life consistent with long work shifts. One or more components of circuitry 200 may be incorporated in the electronic module 502 and/or the headset 503. The electronics module 502 is remotely coupled to a light-weight and comfortable headset 503 secured to a worker head via a headband 504. The headband 504 can be a band that is designed to fit on a worker's head, in an ear, over an ear, or otherwise designed to support the headset. The headset 503 includes one or more speakers 505 and includes one or more microphones. For instance, in the embodiment illustrated in FIG. 5, the headset 503 includes microphones 506, 507. Microphone 507 can provide for noise cancellation by continuously listening to and blocking environmental sounds to enhance voice recognition and optionally provide for noise cancellation. In some embodiments (not shown), the electronics module 502 can be integrated into the headset 503 rather than being remotely coupled to the headset 503. Various configurations may be used without deviating from the intent of the present disclosure.

In some embodiments, the electronics module 502 can be used to offload several components of the headset 503 to reduce the weight of the headset 503. In some embodiments, one or more of a rechargeable or long life battery, display, keypad, Bluetooth® antenna, and printed circuit board assembly (PCBA) electronics can be included in the electronics module 502 and/or otherwise incorporated into the user device 500.

In the embodiment illustrated in FIG. 5, the headset 503 attaches to the electronics module 502 via a communication link such as a small audio cable 508, but could instead communicate with the electronics module 502 via a wireless link. In some embodiments, the headset 503 has a low profile. For instance, headset 503 can be minimalistic in appearance in some embodiments, such as a Bluetooth earpiece/headphone.

Electronics module 502 can be used with various headsets 503, such as VOCOLLECT™ headsets. The electronics module 502 can read a unique identifier (I.D.) of the headset 503, which can be stored in the circuitry of the user device 500 (e.g., the circuitry 200) and is also used to electronically couple the speakers and microphones to electronics module 502. In one embodiment, the audio cable 508 includes multiple conductors or communication lines for signals which can include a speaker +, speaker −, ground digital, microphone, secondary microphone, and microphone ground. The electronics module 502 can utilize a user configurable attachment 509, such as a plastic loop, to attach to a user. For instance, in the embodiment illustrated in FIG. 5, the electronics module 502 can be mounted to a worker torso via a lapel clip and/or lanyard.

In some embodiments, the headset 503 can include a small lightweight battery, such as when a wireless link between the headset 503 and electronics module 502 is used, such as Bluetooth type of communication link. The communication link can provide wireless signals suitable for exchanging voice communications.

In some embodiments, voice templates can be stored locally in the electronic module 502 and/or the headset 503 as part of the circuitry 200 to recognize a user's voice interactions and may convert the interaction into text based data (e.g., text requests) and commands for interaction with an application running in the circuitry 200. For example, the user device 500 can perform voice recognition in one embodiment utilizing the voice templates. Further, in one embodiment, the first stages of voice recognition can be performed in the user device 500, with further stages performed on a server 160. In further embodiments, raw audio can be transmitted from user device 500 to the server 160 where the final stages of voice recognition are completed.

In the embodiment illustrated in FIG. 5, the user device also includes a sensor 520 configured to determine the location of the user device. The sensor 520 may include, but may not be limited to, a ground imaging sensor, an electro-optic sensor, a GPS receiver, accelerometer, and the like. In an embodiment, the sensor 520 may determine a location of the user by determining GPS coordinates of the user device 110A-N and/or a vehicle. The sensor 520 may communication or interact with other components of the circuitry 200, such as processor 210, to determine whether the user is in transit, such as in transit to a desired location. In another embodiment, the current location of the user may be obtained based on a current time and by referring to a pre-determined delivery schedule. Alternatively, a current location of the user may be obtained from a completed workflow solution task. By way of an example, if a user completed a delivery a retail store, the user may update an associated workflow task as "Completed" or "Delivered." This information may be used by the user device 110A-N and/or the server 160 to identify the location of the retail store as a current location of the user.

Figure 6:
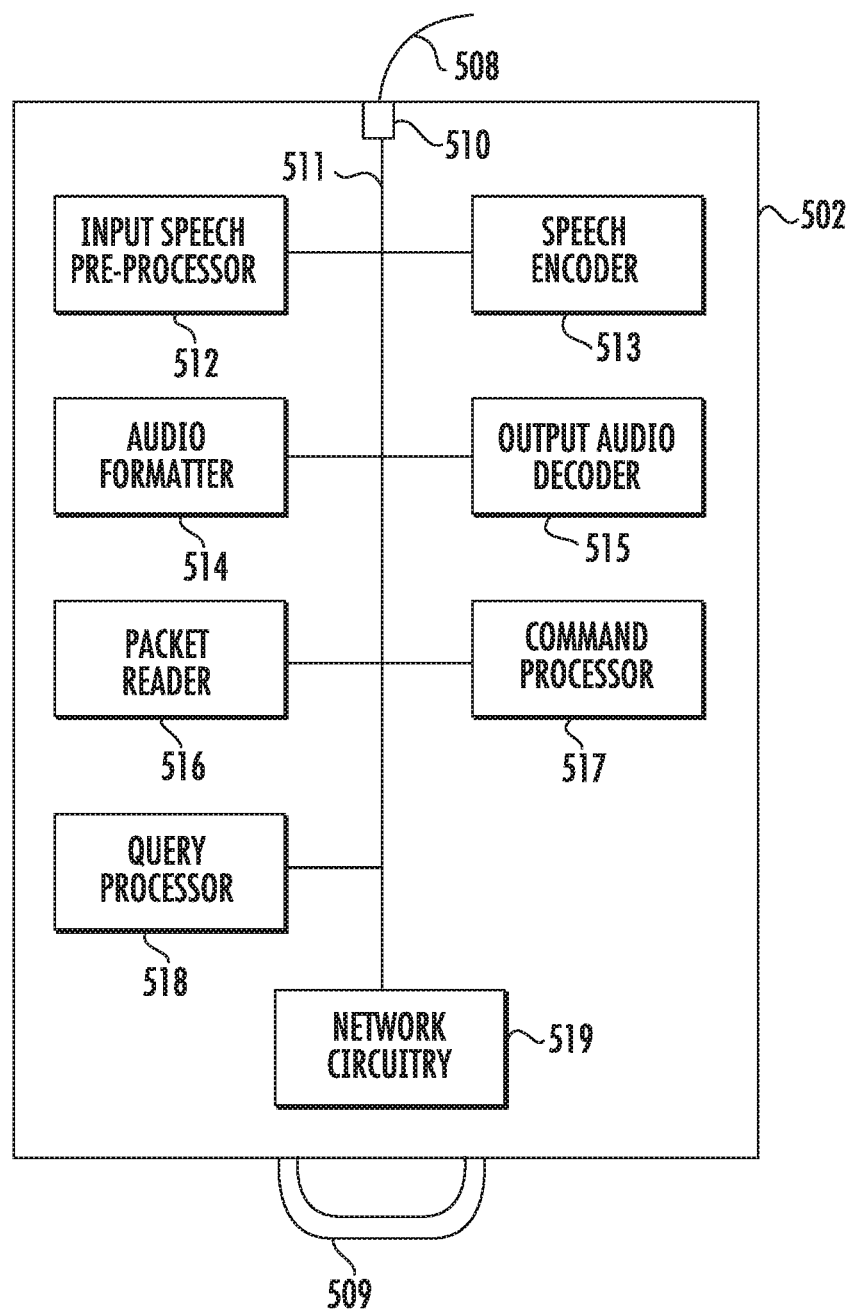
FIG. 6 illustrates a block diagram of an exemplary user device according to an example embodiment.

FIG. 6 illustrates an exemplary block diagram of an electronics module 502 in accordance with some embodiments of the present disclosure. The components illustrated in FIG. 6 may be in addition to one or more components of the circuitry 200 shown in FIG. 2, which may be part of the electronics module 502. In some embodiments, one or more of the components illustrated in FIG. 6 may be included in the electronics module 502 and/or other parts of the user device 500, user devices 110A-110N, and/or server 160. For instance, the electronics module 502 may be included in a vehicle communication device integrated and/or attached to the vehicle.

In the embodiment shown in FIG. 6, the electronics module 502 includes an enclosure, such as plastic case, with a connector 510 that mates with a complimentary mating connector (not shown) on audio cable 508. An internal path 511 is used to communicate between multiple components within the electronics module 502 enclosure. In one embodiment, an input speech pre-processor (ISPP) 512 converts input speech into pre-processed speech feature data. An input speech encoder (ISENC) 513 encodes input speech for transmission to one or more other parts of circuitry 200 for reconstruction and playback and/or recording. A raw input audio sample packet formatter 514 transmits the raw input audio to one or more other parts of circuitry 200 using an application-layer protocol to facilitate communications between the circuitry 200 and headset 503 as the transport mechanism. For the purposes of the transport mechanism, the formatter 514 can be abstracted to a codec type referred to as Input Audio Sample Data (IASD). An output audio decoder (OADEC) 515 decodes encoded output speech and audio for playback in the headset 503. A raw output audio sample packet reader 516 operates to receive raw audio packets from one or more other parts of circuitry 200 using the transport mechanism. For the purposes of the transport mechanism, this formatter 514 can be abstracted to a codec type referred to as Output Audio Sample Data (OASD). A command processor 517 adjusts the headset 502 hardware (e.g., input hardware gain level) under control of one or more other parts of circuitry 200. A query processor 518 allows one or more other parts of circuitry 200 to retrieve information regarding headset operational status and configuration. Path 511 is also coupled to network circuitry 519 to communicate via wired or wireless protocol with one or more other parts of circuitry 200. The ISPP 512, ISENC 513, and raw input audio formatter 514 are sources of communication packets used in the transport mechanism; the OADEC 515 and raw output audio reader 516 are packet sinks. The command and query processors 517, 518 are both packet sinks as well as sources (in general they generate acknowledgement or response packets).

Figure 7:
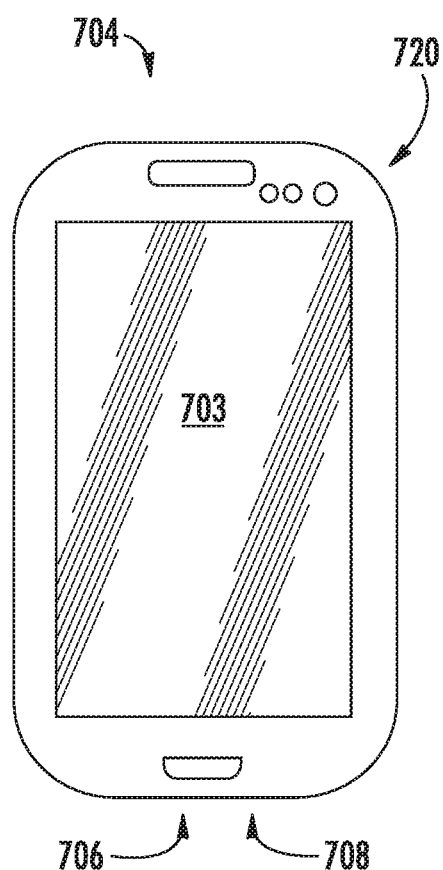
FIG. 7 illustrates an exemplary user device according to an example embodiment.

FIG. 7 illustrates an exemplary user device according to an example embodiment. In the embodiment illustrated in FIG. 7, the user device is a handset 704 (e.g., a mobile device or tablet device). The handset 704 may include one or more components of circuitry 200 as explained with regards to FIG. 1 and may include one or more of the components discussed with regards to the headset of FIGS. 5 and 6 (e.g., voice templates, speech encoders, etc.). The handset 704 may include one or more microphones 706 and one or more speakers 708, which may be connected to a set of headphones. The handset 704 can also include one or more antenna. The microphone 706 receives speech or sound and transmits the received speech and sound to one or more components of circuitry 200 in the handset 704. The speakers 708 receive an audio transmission from one or more components of circuitry 200 in the handset 704 and output the audio transmission in the form of speech or sound. In an embodiment, the speakers 708 can also include noise cancellation. The handset 704 may connect with one or more other user devices 110A-110N and/or server 160 as explained with regards to FIG. 1. For instance, in some embodiments, the handset 704 may connect to a wireless headphone via a Bluetooth connection, where the wireless headphone includes a microphone and speaker for receiving speech and outputting speech or sound. The handset 704 can also include a user input device and output device (such as the display 703 forming an interface) to send and receive additional non-auditory information from circuitry 200, whether incorporated into the handset 704 or in other user devices 110A-110N and/or server 160. The display 703 of FIG. 7 may be a backlit LCD or OLED display. With the use of a handset 704 having one or more microphones 706 and one or more speakers 708, a user can communicate with a central server (e.g., server 160) and/or with other user devices (e.g., user devices 110A-110N).

In the embodiment illustrated in FIG. 7, the user device also includes a sensor 720 configured to determine the location of the user device. The sensor 720 may include, but may not be limited to, a ground imaging sensor, an electro-optic sensor, a GPS receiver, accelerometer, and the like. In an embodiment, the sensor 720 may determine a location of the user by determining GPS coordinates of the user device 110A-N and/or a vehicle. The sensor 720 may communication or interact with other components of the circuitry 200, such as processor 210, to determine whether the user is in transit, such as in transit to a desired location. The processor 210 may then interact with the display 703 to lock the display while the user is in transit or in motion. The processor 210 may also unlock the display 703 when the user is determined to not be in transit or in motion and/or has arrived at the desired location. One or more applications may be used to lock and unlock the display 703 depending on the status of the user and/or user device. In another embodiment, the current location of the user may be obtained based on a current time and by referring to a pre-determined delivery schedule. Alternatively, a current location of the user may be obtained from a completed workflow solution task. By way of an example, if a user completed a delivery a retail store, the user may update an associated workflow task as "Completed" or "Delivered." This information may be used by the user device 110A-110N and/or the server 160 to identify the location of the retail store as a current location of the user.

Although FIG. 7 illustrates one example of a handheld device, various changes may be made to FIG. 7. For example, all or portions of FIG. 7 may represent or be included in other handheld devices and/or vehicle communication devices and may be used in conjunction with a headset such as the headset of FIG. 5. Also, the functional division shown in FIG. 7 is for illustration only. Various components could be combined, subdivided, or omitted and additional components could be added according to particular needs.

One suitable device for implementing the present disclosure may be the TALKMAN® product available from VOCOLLECT™ of Pittsburgh, Pa. In accordance with one aspect of the present disclosure, the user device uses a voice-driven system, which may use speech recognition technology for communication. In an embodiment, the user device may provide hands-free voice communication between the user and the user device. To that end, digital information may be converted to an audio format, and vice versa, to provide speech communication between the user device or an associated system and the user. In an example embodiment, the user device may contain digital instructions or receive digital instructions from a central computer and/or a server and may convert those instructions to audio to be heard by the user. The user may then reply, in a spoken language, and the audio reply or the speech input may be converted to a useable digital format to be transferred back to the central computer and/or the server. In other embodiments, the user device may operate independently, in an offline mode, such that speech digitization, recognition and/or synthesis for implementing a voice-driven workflow solution may be performed by the user device itself.

Figure 8:
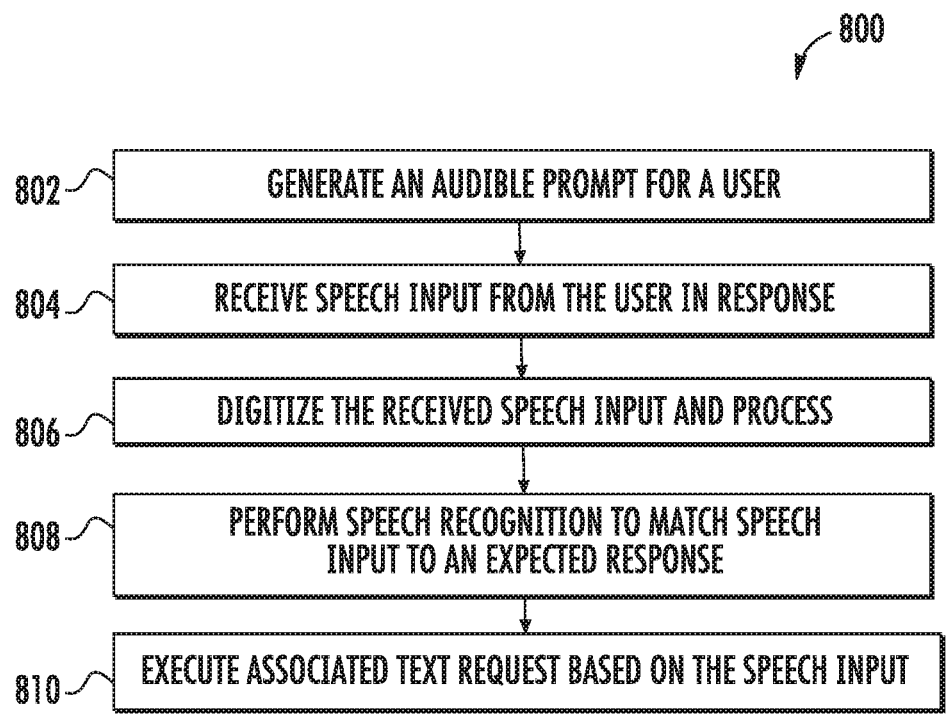
FIG. 8 shows a flowchart illustrating a method of utilizing voice-driven technology according to an example embodiment.

FIG. 8 illustrates an exemplary embodiment of a method 800 for providing voice based communication and/or speech dialog between a user and a device in the direct store delivery (DSD) environment. The method 800 may include generating speech for a user 802. In an embodiment, the user device may include output devices, such as, speakers for receiving digital instructions and/or commands from one or more components of the circuitry in the user device and output the audio transmission in the form of speech or sound. In an embodiment, the circuitry may include a dialog engine in operative communication with one or more components of the circuitry. The dialog engine may also be stored in the memory of the user device. For a given workflow task, the user device may be required to carry on a dialog with the user, which may include a series of messages or instructions or questions to output to the user. Such elements of the dialog may be referred to as "prompts". In accordance with one aspect of the present disclosure, the prompts may be output in the form of speech generated by the dialog engine and/or the speakers. For example, a prompt asking a user for a quantity of goods may designate that an audible prompt be provided by the speaker to the user, in accordance with the invention. Additionally, the prompt may also include information indicating which input modes or components are appropriate to capture or receive any incoming data for answering or addressing the prompt.

As described above, the dialog engine may be instructed by one or more components of the circuitry as to which modes or components to use for any given prompt. Thus, the dialog engine may manage the output components and the input components of the user device. For example, the dialog engine may provide an output prompt by causing a voice synthesizer with a text-to-speech (TTS) functionality to produce an appropriate audible prompt played by the speaker.

The method 800 may further include receiving a speech input from a user in response 804. In accordance with one aspect of the present disclosure, the system may include a series of instances or junctures where an input is expected to be received from the user in response to the prompt. For example, a prompt asking a user for a desired location may require a user to provide an input, such as, speech input, providing location information, in accordance with the invention. In an example embodiment, the user device, as described above, may further include input devices, such as a microphone for receiving speech inputs from a user. The microphone may further transmit the received speech input to one or more components of circuitry in the user device for further processing and recognition.

The method 800 may include digitizing the received speech input and processing digitized speech 806. In accordance with one aspect of the present disclosure, a microphone or other electro-acoustical components of the user device may receive a speech input from a user and may convert the speech input into an analog voltage signal. The analog voltage signal may then be forwarded to one or more components of the circuitry, such as, but not limited to, analog to digital convertors, audio processing circuits such as audio filters, correlation circuitry, and the like. Specifically, the circuitry may include suitable digitization circuitry for providing appropriate representations of the speech input received from the user for further processing. In an embodiment, the digitization circuitry may include an audio coder/decoder chip or CODEC. Further, the digitization circuitry may include necessary filters, equalization circuitry and/or software for converting the analog speech input into a digitized stream of data that can be separated into separate units for analysis.

Further, in accordance with one aspect of the present invention, the circuitry may further include audio and/or speech analysis circuitry and signal processing circuitry for analyzing and further processing the digitized speech inputs. For example, the user device may include spectral transformation circuitry, or audio filtering circuitry, such as Mel scale filters, which may create a spectral transform of the digitized audio signals and may provide a series of sampled representations or values associated with the digitized audio signals. In an example embodiment, the circuitry may divide the digital stream of data that may be created into a sequence of time-slices, or frames, each of which may then be processed by a feature generator, thereby producing features (vector, matrix, or otherwise organized set of numbers representing the acoustic features of the frames). The features may then be used by speech recognition components of the circuitry for further processing.

The method 800 may further include performing speech recognition to match speech input to an expected response 808. In accordance with one aspect of the present disclosure, a speech recognition search algorithm function, realized by an appropriate circuit and/or software in the user device may analyze the features, as described above, to determine what hypothesis to assign to the speech input captured by the microphone of the user device. As is known in the art, in one recognition algorithm, the recognition search relies on probabilistic models provided through a database of suitable models to recognize the speech input. Each of the models in the database may either be customized to a user or be generic to a set of users.

Hidden Markov Models (HMM) may be used for the speech recognition. In speech recognition, these models may use sequences of states to describe vocabulary items, which may be words, phrases, or subword units. As used herein, the term "word" may refer to a vocabulary item, and thus may mean a word, a segment or part of a word, or a compound word, such as "next slot" or "say again." Therefore, the term "word" may not be limited to just a single word. Each state in an HMM may represent one or more acoustic events and may serve to assign a probability to each observed feature vector. Accordingly, a path through the HMM states may produce a probabilistic indication of a series of acoustic feature vectors. The model may be searched such that different, competing hypotheses (or paths) are scored; a process known as acoustic matching or acoustic searching. A state S may be reached at a time T via a number of different paths. For each path reaching a particular state at a particular time, a path probability may be calculated. Using the Viterbi algorithm, each path through the HMM may be assigned a probability. In particular, the best path may be assigned a probability. Furthermore, each word in the best path may be assigned a probability. Each of these probabilities may be used as a confidence factor or combined with other measurements, estimates or numbers to derive a confidence factor. The path with the highest confidence factor, the best hypothesis, can then be further analyzed.

When in operation, the search algorithm (which can be implemented using Hidden Markov Models with a Viterbi algorithm or other modeling techniques such as template matching dynamic time warping (DTW) or neural networks), in essence, may compare the features generated, as described above, with reference representations of speech, or speech models, in the database in order to determine the word or words that best match the speech input from the user device. In an embodiment, part of this recognition process may be to assign a confidence factor for the speech to indicate how closely the sequence of features from the search algorithm matches the closest or best-matching models in the database. As such, a hypothesis consisting of one or more vocabulary items and associated confidence factors may be directed to an acceptance algorithm to determine expected response. In accordance with the above embodiment, if the confidence factor is above a predetermined acceptance threshold, then the acceptance algorithm may decide to accept the hypothesis as recognized speech. If, however, the confidence factor is not above the acceptance threshold, as utilized by the acceptance algorithm, then the acceptance algorithm may decide to ignore or reject the recognized speech. The user device may then prompt the user to repeat the speech input. In this instance, the user may repeat the audio input provided to the microphone.

The method 800 may further include executing the text request associated with the speech input 810. That is, a text request may be associated with the recognized speech and then acted upon after processing the speech input. Thus, when the digitized and processed speech input matches the expected response, the associated text request is executed by the circuitry and/or associated processor based on the speech input.

Figure 9:
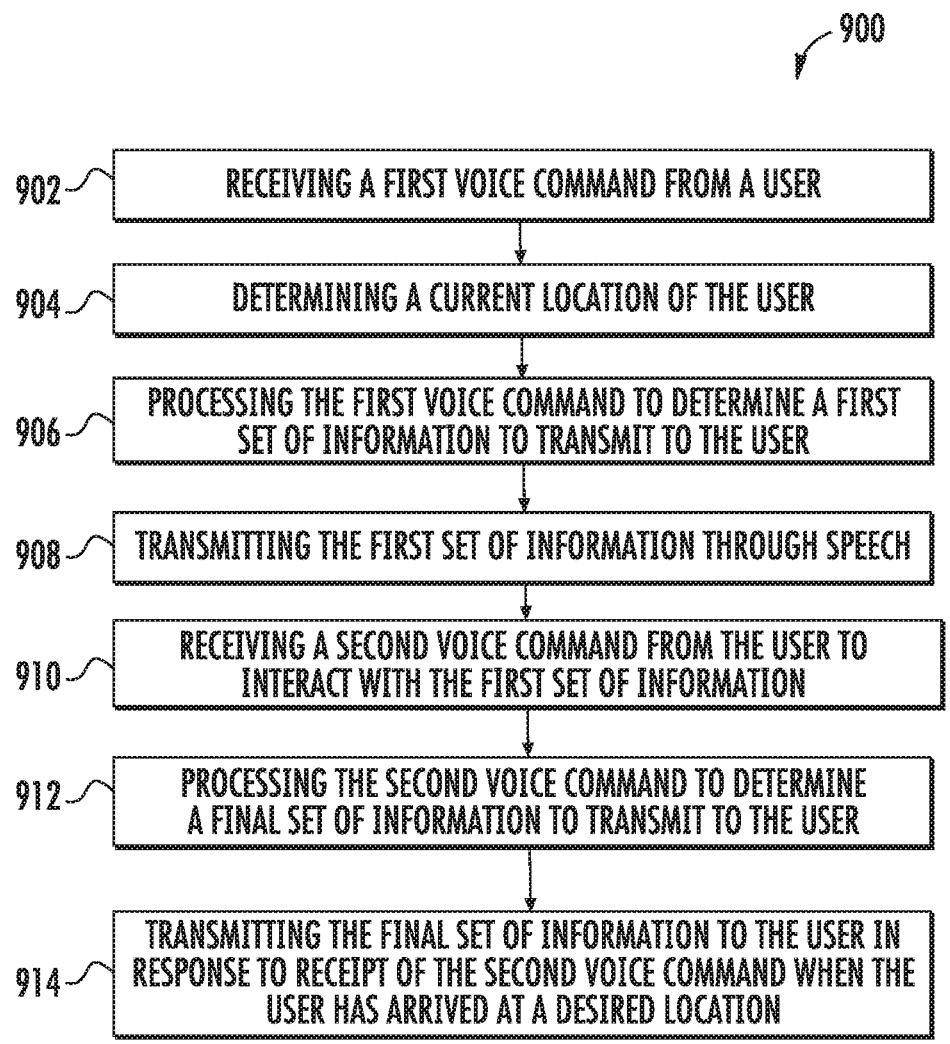
FIG. 9 shows a flowchart illustrating a method of providing customized information according to an alternate example embodiment.

FIG. 9 illustrates an exemplary embodiment of a method 900 for providing customized information to a user. The method 900 may include receiving a first voice command from a user 902. In this regard, a user may provide a first voice command to a user device, a server, and/or any other device in a system. In an embodiment, the first voice command may be received by an input/output module 250 of the user device 200, as shown in FIG. 2. In accordance with an exemplary embodiment, with reference to FIGS. 5 and 7, the first voice command may be received by a microphone 506, 507, and/or 706 of a user device 500, 700 respectively. Further, as described above, the first voice command may refer to a speech signal input provided by a user to a user device and/or any other device in a system. In an exemplary embodiment, the first voice command may be used by a user to request certain data from a user device and/or a server. For example, a user may provide a first voice command, such as, "OFFERS FOR NEXT CUSTOMER" to a user device to request a list of all offers currently available at the server that may be relevant to a customer at a next delivery location. The user device may receive the first voice command, as described above, through a microphone (e.g., microphones 506, 507, 706).

The method 900 may further include determining a current location of the user 904. As described above, it may be desirable to know a current location of the user to identify a next customer in a direct store delivery system. In an embodiment, a current location of the user may be determined by a sensor in a user device (e.g., user device 110A-110N). Further, the sensor may include, but may not be limited to, a ground imaging sensor, an electro-optic sensor, a GPS receiver, accelerometer, and the like. In an embodiment, the sensor may determine a location of the user by determining GPS coordinates of the user device and/or a vehicle. In another embodiment, the current location of the user may be obtained based on a current time and by referring to a pre-determined delivery schedule. Alternatively, a current location of the user may be obtained from a completed workflow solution task. By way of an example, if a user completed a delivery a retail store, the user may update an associated workflow task as "Completed" or "Delivered." This information may be used by the user device and/or the server to identify the location of the retail store as a current location of the user. It should be noted that the above description is for exemplary purpose and the method 900 may include determining a current location of a user by other ways, not disclosed here.

As illustrated in FIG. 9, the method 900 may further include processing the first voice command to determine a first set of information to transmit to the user 906. As described above, the first set of information may include data and/or information provided to a user by a user device, server, database, and/or any other device in a system. In an embodiment, the first set of information may be determined in response to the first voice command, as described above, received from a user. In this regard, the first set of information may include data related to offers, services, products, sales information, and the like, as requested by the user by the first voice command. By way of the above example, on receiving a first voice command, "OFFERS FOR NEXT CUSTOMER", the DSD system 400, as described above with reference to FIG. 4, may determine a list of offers that may be of interest to a customer at a next delivery location based on the data received from the DSD database 300, as shown in FIG. 3. As noted above, the DSD system 400 may be located on a user device and/or server (e.g., various parts of the DSD system 400 may be housed on different physical devices).

Further, with reference to Block 906, processing the first voice command to determine a first set of information may include transforming the first voice command into a first text request. In an embodiment, the circuitry 200 and/or the electronics module 502, as shown in FIGS. 2 and 5, of a user device 110A-110N may determine and convert audio signals of the first voice command to points in data. Specifically, the electronics module 502, as described above with reference to FIG. 6, may include, at least, a input speech pre-processor 512 and a speech encoder 513 to parse the speech signal input in the first voice command and identify points in speech signal input which may be compared to a stored vocabulary and/or voice template to convert the first voice command to a digital data understandable by the user device 110A-110N in the form of a first text request. In an embodiment, the speech signal input of the first voice command may be parsed to identify one or more points in speech which may be used as keywords for identifying relevant data from a server and/or a database in the first text request. By way of the above example, the first voice command "OFFERS FOR NEXT CUSTOMER" may be transformed into a first text request by converting points, such as, "OFFERS", "NEXT CUSTOMER" in speech to points in data, such as, data in the DSD database 300 that relates to offers, from Product/Services data 312, and a next customer, from Customer Data 311. The method at Block 906 may further include processing the first text request to determine the first set of information, such that the first set of information may be provided audibly to the user. The determination of the first set of information may be performed on the user device and/or server. Further, processing the first text request to determine the first set of information may be based on the determined current location of the user and/or the user device. In this regard, the circuitry 200 and/or the electronics module 502 may process the first text request to determine the data requested by the user through the first voice command. The processing of the first text request may be performed on the user device and/or server. By way of the above example, the circuitry 200 and/or the electronics module 502 may process the first text request and may determine that the user has requested data related to offers for a next customer. Thus, the user device and/or server may determine the next customer based on a current location of the user, as determined at Block 904 of the method 900. Further, the user device and/or server (e.g, by the DSD system 400) may fetch data related to all available offers related to products and/or services, and may determine data related to the next customer, such as, customer profile, historical data, and the like. The processor 210 and the DSD system 400 may correlate the data obtained from the DSD database 300 to determine a first set of information. By way of the above example, the processor 210 may identify offers from a list of all offers that may be of interest to the next customer based on the obtained customer data. For example, if the customer data indicates that the next customer is a pharmaceutical store, and/or that the next customer is a retail store that often places an order on beverages, thus, the processor 210 may identify offers, from the list of all available offers, that may relate to pharmaceutical products, and/or beverages, respectively. Thus, the offers selected from a list of all offers may be determined as a first set of information by the processor 210. Further, the circuitry 200 and/or the electronics module 502 may convert the first set of information into an audible format, by, for example, a digital to analog converter, to be provided audibly to the user. The first set of information may be transmitted through speech to the user, as shown in Block 908. In an embodiment, the first set of information may be transmitted through a speaker 505, 708 of a user device 500, 700. By way of the above example, the first set of information may be a list of offers that may be of interest to the next customer. The list of offers may be transmitted in an audible format through a speaker of a user device and/or a vehicle.

The method 900, as illustrated in FIG. 9, may further include receiving a second voice command from the user to interact with the first set of information 910. In this regard, in response to the provision of the first set of information to the user, a user device 110A-110N may receive a second voice command from the user, such that the second voice command may be configured to interact with the first set of information. By way of the above example, a user device 500, 700 may transmit the first set of information, that is, the list of offers for the next customer, in an audible format to the user. In an embodiment, the user device 500, 700 may provide each offer, one by one, and may wait to receive a second voice command from the user on the provided offer. Thus, the term "second voice command" as used herein may refer to any data, response, and/or information provided by a user as a speech signal input to accept, modify, reject, and/or perform any other interaction on one or more portions of the first set of information received by the user. The second voice command may include pre-determined phrases, and/or may include any speech signal input which may be parsed and recognized by a speech circuitry. For example, the user device 500, 700 may provide, audibly, an offer for "30% OFF ON BEVERAGES" to a user and may receive a second voice command from the user, saying, for example, "ACCEPT" to retain the offer, and/or "REJECT" to remove the offer from the list of offers for the next customer. Thus, the user may interact with and/or modify the first set of information by providing a second voice command.

The method 900, as illustrated in FIG. 9, may further include processing the second voice command to determine a final set of information to transmit to the user 812. The term "a final set of information" as used herein may refer to a final set of data and/or information provided to a user by a user device, server, database, and/or any other device in a system by modifying, if required, the first set of information based on the second voice command. In an embodiment, the final set of information may include information relevant to the desired location. By way of the above example, the user device 500, 700 may process the second voice command, for example, "REJECT" associated with an offer, and may, in response, remove the offer from the list of offers for the next customer at the desired location. Thus, each second voice command received, separately for each offer and/or once for the entire list of offers, may be processed by the user device 500, 700 and/or any other device in the system, to remove all rejected offers from the list of offers. Thereby, a final list of offers is customized for the next customer as a final set of information.

The method 900 may further include transmitting the final set of information to the user in response to receipt of the second voice command when the user has arrived at a desired location 814. The term "desired location" as used herein may refer to any destination and/or location that the user may be in transit towards. In some cases, the user and/or the user device may be in transit to a delivery location. In other cases, the user and/or the user device may be in transit to a location within a warehouse and/or a distribution center, such as a specific aisle. Thus, the delivery location and/or the aisle may be referred to as a desired location. Further, the term "in transit" as used herein may refer to a user and/or a user device that may be in motion, and, more particularly, may be moving towards a desired location. In an embodiment, the final set of information may be provided to the user by visually displaying the final set of information to the user in an instance when the user may be determined to have reached the desired location. In this regard, the final set of information may be displayed on a display screen of a user device, e.g., user device 110A-110N, 700. As described above, due to safety reasons, a display screen of a user device 110A-110N of the user may be disabled and/or locked when the user is in transit (a "screen lock condition"). In an embodiment, a sensor, as described above, may determine that the user and/or the user device is in motion. The sensor may include, but is not limited to, an accelerometer, a gyroscope, an imager, and the like. In response, the display screen may be locked by the user device e.g., user device 110A-110N, 700. This avoids any distraction caused to the user by displaying data and/or requesting inputs on the user device. Instead, the method, as disclosed herein, relies on voice command and speech signals to communicate with the user when the user and/or a vehicle driven by the user are in motion. Thus, once the user is determined to have reached a desired location, such as a delivery location, and the user and/or the user device is no longer in motion and/or transit, the display screen of the user device may be unlocked and the final set of information, such as a final list of offers for the customer at the desired location, may be visually displayed on an interface on the display screen of the user device. By way of the above example, the final set of information may be displayed in the form of a checklist and/or a task list of a final list of offers for the next customer. The user and/or the customer may further select one or more offers that the customer may wish to take advantage of.

Thus, the method 900, as disclosed herein, uses the dead-time in transit and/or between deliveries, efficiently, to curate a list of products, offers, sales information, training modules, tips, sales performance, next stop information (e.g., products to be delivered and how many, special requirements/procedures/interests of the next stop), remaining stops information, surveys, suggestions for sales/products (e.g., complimentary products, related products), new product information (e.g., statistics, competitor information), pricing information, messages for the delivery driver, etc., and/or services for a customer at a delivery location, while ensuring safety of the user and/or a delivery driver, in transit, by using audio and/or speech signals to communicate with the user and/or the delivery driver.

Figure 10:
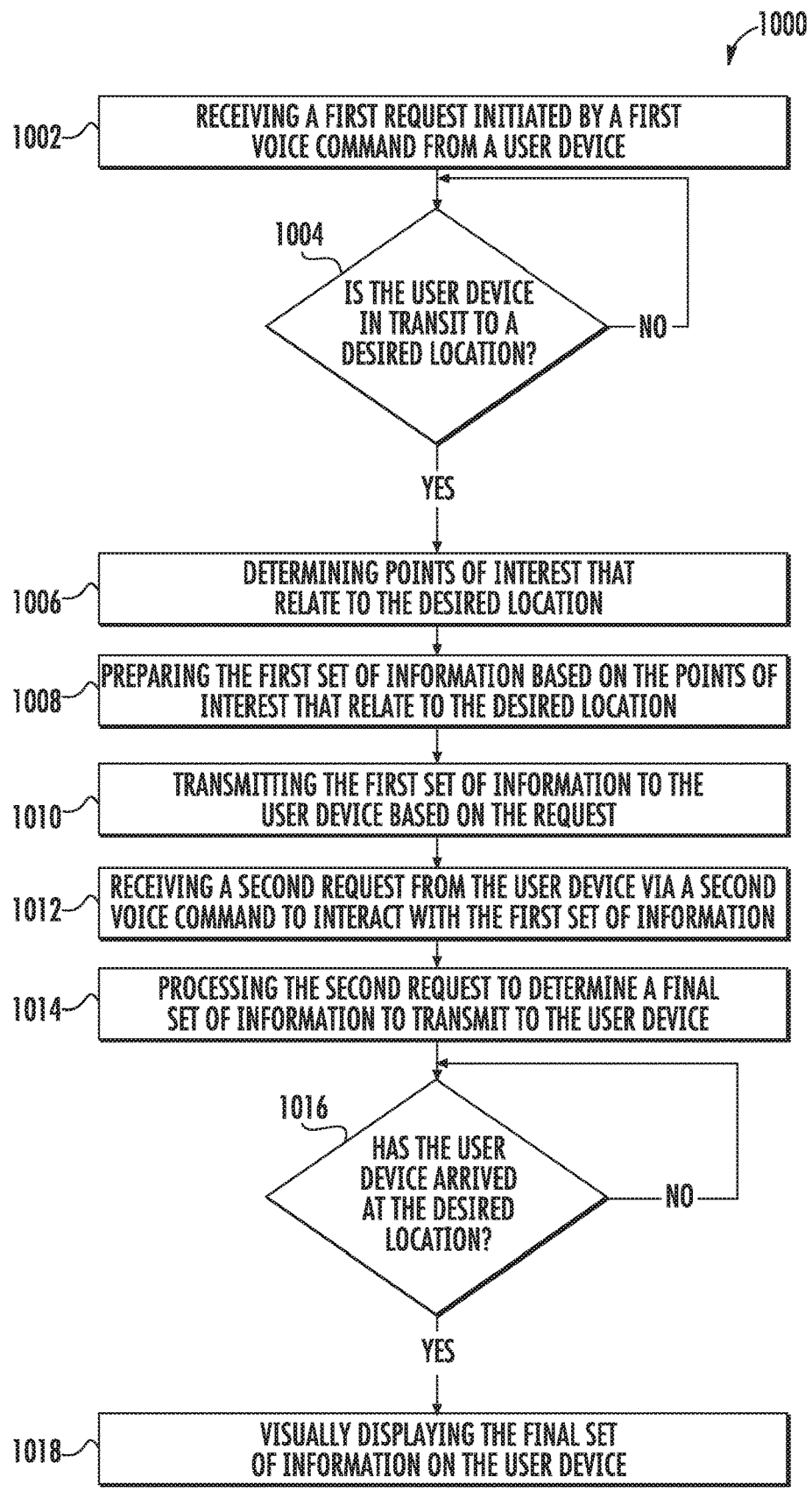
FIG. 10 shows a flowchart illustrating a method of providing customized information according to an alternate example embodiment.

FIG. 10 illustrates an exemplary embodiment of a method 1000 for providing customized information to a user. The method 1000 may include receiving a first text request initiated by a first voice command from a user device 1002. As described above, a user may provide a first voice command to an input/output module 250 of the user device 200, as shown in FIG. 2. In accordance with an exemplary embodiment, with reference to FIGS. 5 and 7, the first voice command may be received by a microphone (e.g., microphones 506, 507, and/or 706 of a user device 500, 700 respectively). Further, as described above, the first voice command may refer to a speech signal input provided by a user to a user device and/or any other device in a system. For example, a user may provide a first voice command, such as, "OFFERS FOR NEXT CUSTOMER" to a user device 500, 700 to request a list of all offers currently available at the server 160 that may be relevant to a customer at a next delivery location. The user device 500, 700 may receive the first voice command, as described above, through a microphone 506, 507, 706.

The method 1000 may further include determining whether the user device is in transit to a desired location 1004. In this regard, the user device 110A-110N may include sensors, such as, but not limited to, an accelerometer, gyroscope, to determine if the user device is in motion. In an embodiment, the sensor may obtain motion data of the user device 110A-110N. The motion data may include data related to whether the user device 110A-110N is in motion. Further, the user device may determine a current location of the user device and may compare it to a pre-determined delivery route and/or a location of the desired location, such as a next delivery location, to determine if the user device is moving towards the desired location. In an embodiment, the user device 110A-110N may receive a location data, such as GPS coordinates, from the user device 110A-110N, such that the location data may relate to a current location of the user device. The location data may be processed to determine the current location of the user device 110A-110N. Processing may occur at the user device and/or a server. Further, a current location of the user device may be determined by a sensor in the user device 110A-110N, such as, a ground imaging sensor, an electro-optic sensor, a GPS receiver, and the like. The desired location may be obtained from a per-determined delivery schedule, a server, a database, and the like. In an embodiment, the user device may determine a travel route, from a server, for example, for the user device based on the current location, and may determine a desired location based on the travel route. The location data of the user device may then be monitored and/or tracked to determine if the user device is moving along the travel route towards the desired location.

With reference to FIG. 10, if the user device is determined to not be in transit to the desired location 1004, the method 1000 may continue tracking the current location and/or a route of the user device and comparing it to the desired location 1004, periodically, at regular intervals, and/or continuously. In other embodiments, the first set of information may be visually displayed while the current location is continuously monitored (such as after determining points of interest that relate to the desired location and curating the first set of information based on the points of interest that relate to the desired location as further described below). Once it is determined that the user device is in transit, then the visual display may be removed or locked such that the user is not able to interact with the first set of information through the user interface and instead, can interact with the information by way of speech or audio signals. The method may then proceed as shown in FIG. 10.

If the user device is determined to be in transit to the desired location, the method 1000 may include determining points of interest in the first text request that relate to the desired location 1006. In an embodiment, the circuitry 200 and/or the electronics module 502, as shown in FIGS. 2 and 5, of the user device 110A-N may determine and convert points in speech signal input of the first text request to points in data. Specifically, the electronics module 502, as described above with reference to FIG. 6, may include, at least, a input speech pre-processor 512 and a speech encoder 513 to parse the speech signal input in the first text request and identify points in speech signal input which may be compared to a stored vocabulary and/or voice template to determine points of interest that relate to the determined desired location. By way of the above example, the first voice command and/or the first text request "OFFERS FOR NEXT CUSTOMER" may be analyzed to determine points of interest, such as, "OFFERS", "NEXT CUSTOMER" that relate to the desired location, such as, a delivery location of the next customer. The method 1000 may further include preparing a first set of information based on the points of interest that relate to the desired location 1008. By way of the above example, the user device 500 and/or the DSD system 400 may fetch data related to all available "OFFERS" related to products and/or services, and may determine data related to the "NEXT CUSTOMER", such as, a customer profile, historical data, and the like, as identified by the points of interest related to the desired location. The processor 210 and the DSD system 400 may correlate the data obtained from the DSD database 300 to determine a first set of information. For example, the processor 210 may identify offers from a list of all offers that may be of interest to the next customer based on the obtained customer data. Specifically, if the customer data indicates that the next customer is a pharmaceutical store, the processor 210 may identify offers, from the list of all available offers, which may relate to pharmaceutical products.

Further, the method 1000 may include transmitting the first set of information to the user device based on the request, such that the first set of information may be provided audibly to the user 1010. In an embodiment, as described above, the circuitry 200 and/or the electronics module 502 may convert the first set of information into an audible format, by, for example, a digital to analog converter. In an embodiment, the first set of information may be transmitted through a speaker (e.g., speaker 505, 708 of a user device 500, 700). By way of the above example, the first set of information may be a list of offers that may be of interest to the next customer. The list of offers may be transmitted in an audible format through a speaker of a user device and/or a vehicle. The method 1000 may further include receiving a second text request from the user device via a second voice command 1012, such that the second text request may interact with the first set of information. In this regard, in response to the provision of the first set of information to the user, a user device 110A-110N and/or a server may receive a second text request via a second voice command from the user device 110A-110N, such that the second text request may be configured to interact with the first set of information. By way of the above example, a user device 500, 700 may transmit the first set of information, that is, the list of offers for the next customer, in an audible format to the user. In an embodiment, the user device 500, 700 may provide each offer, one by one, and may wait to receive a second text request via a second voice command on the provided offer. As described above, the second text request may include pre-determined phrases, and/or may include any speech signal input which may be parsed and recognized by a speech circuitry, for example, "ACCEPT" to retain the offer, and/or "REJECT" to remove the offer from the list of offers for the next customer. Thus, the user may interact with and/or modify the first set of information by providing a second voice command to the user device as a second text request.

The method 1000 may further include processing the second text request to determine a final set of information to transmit to the user device 1014. As described above, a final set of information may refer to a final set of data and/or information provided to a user device, server, database, and/or any other device in a system by modifying, if required, the first set of information based on the second text request. By way of the above example, the user device (e.g., user device 500, 700) and/or server may process the second text request, for example, "REJECT" associated with an offer, and may, in response, remove the offer from the list of offers for the next customer. Thereby, a final list of offers is curated for the next customer as a final set of information. In another embodiment, the second text request may accept portions of the first set of information, and the user device and/or server may curate the final set of information based on the acceptance of the portions of the first set of information. In a further embodiment, the second text request may modify the first set of information. In this regard, the user device and/or server may determine the modifications of the first set of information based on the second text request, and may curate the final set of information based on the determined modifications of the first set of information.

In an embodiment, (not shown in FIG. 10), additional points of interest that relate to the desired location may be determined by the user device and/or server. In response, a second set of information based on the additional points of interest may be prepared and transmitted to the user device for providing the second set of information audibly to the user. In response to the provision of the second set of information to the user, the user device may receive a third text request from the user via a third voice command. In an embodiment, the third text request may interact with the second set of information. Further, the third text request may be processed to determine the final set of information to transmit to the user device. By way of an example, the user device may determine that the user has accepted all offers that may be valid on the same day based on the second text request. The user device and/or server may use this information as an additional point of interest related to the desired location, and may prepare a second set of information including all offers related to targeted customer that may be expiring soon. The second set of information may be provided audibly to the user by the user device. In response, the user device may receive a third text request via a third voice command to accept, modify, and/or reject offers from the second set of information. The second set of information may be processed based on the third text request to determine a final set of information to be transmitted to the user device. Thus, a user may provide multiple requests to the user device to modify and/or filter the set of information provided to the user.

The method 1000 may further include transmitting the final set of information to the user in response to receipt of the second text request when the user has arrived at a desired location. In this regard, the method 1000 may include determining if the user device has arrived at the desired location 1016. In this regard, a current location of the user device may be determined by the user device 110A-110N and/or any other device in the system. In an embodiment, a sensor, in the user device, may determine the current location by determining GPS coordinates of the user device 110A-110N and/or a vehicle. In another embodiment, the current location of the user device may be obtained based on a current time and by referring to a pre-determined delivery schedule. Further, the determined current location of the user device 110A-110N may be compared to the desired location, obtained from a server, a delivery schedule, a database, and the like, by the processor 210 and/or the circuitry 200. If the current location is the same as the desired location, that is, the user device 110A-110N is determined to have arrived at the desired location; the method 1000 may proceed to visually displaying the final set of information on the user device 1018. In this regard, the final set of information may be displayed on a display screen of a user device 110A-110N (e.g., user device 700). By way of the above example, the final set of information may be displayed in the form of a checklist and/or a task list of a final list of offers for the next customer on an interface of the user device 110A-110N (e.g., user device 700). The user and/or the customer may further select one or more offers that the customer may wish to avail itself of. Further, if the user device is determined to have not arrived at the desired location 1016, the method 1000 may continue checking the current location of the user device and comparing it to the desired location 1016, periodically, at regular intervals, and/or continuously.

FIGS. 8-10 illustrate example flowcharts of the operations performed by an apparatus, such as user device of FIG. 1 and/or server of FIG. 1, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 8-10 when executed, convert a computer or processing circuitry into a particular machine configured to perform an example embodiment of the present invention. Accordingly, the operations of FIGS. 8-10 define an algorithm for configuring a computer or processor, to perform an example embodiment. In some cases, a general purpose computer may be provided with an instance of the processor which performs the algorithm of FIGS. 8-10 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the invention(s) set out in any claims that may issue from this disclosure. For instance, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. For example, the various elements or components may be combined or integrated in another system or certain features may be omitted or not implemented. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A voice controlled apparatus that is configured to provide customized information to a user, the voice controlled apparatus comprising:

a microphone configured to receive a voice command from the user;

a speaker configured to transmit speech to the user;

an interface configured to receive inputs from the user and visually output a set of information to the user; and a processor in communication with the microphone, speaker, and interface, wherein the processor is operable to:

cause a screen lock condition to be enabled in an instance in which the voice controlled apparatus receives a plurality of locations that indicate that the user is in transit to a first location, wherein at least the microphone is enabled in the screen lock condition and the interface is disabled during the screen lock condition;

receive a first set of information, wherein the first set of information is responsive to a first voice command transmitted via the microphone, by the user and is relevant to the first location and is generated as a result of a query comprising at least a first text request that represents the first voice command and the first location;

cause the first set of information to be output by the speaker;

in response to the provision of the first set of information to the user, receive a second voice command from the user, wherein the second voice command is responsive to the first set of information;

process the second voice command to determine a final set of information to transmit to the user, wherein the final set of information is a curated collection of information formed by modifying the first set of information in response to the second voice command such that the final set of information is a subset of the first set of information, and wherein the final set of information comprises offers and pricing information relevant to the first location;

validate the final set of information based on determining that the final set of information comprising the offers and the pricing information is valid on a current date;

analyze an inventory status of a delivery vehicle while the user is in transit to the first location to determine an optimal distribution point, wherein the optimal distribution point is determined in response to the inventory status indicating that an inventory item is remaining;

cause the validated final set of information to be output by the speaker in an instance in which the screen lock condition is enabled indicating that the user is in transit to the first location;

cause the validated final set of information to be output by the interface in an instance in which the screen lock condition is disabled; and in response to the inventory status indicating that the inventory item is remaining in the delivery vehicle and in response to the determination of the optimal distribution point, redirect the user to transit to a second location different the first location, wherein the second location corresponds to the optimal distribution point.

2. The voice controlled apparatus of claim 1, wherein the second voice command is configured to interact with the first set of information by at least one of modifying, accepting, or rejecting at least a portion of the first set of information.

3. The voice controlled apparatus of claim 1, wherein the first set of information and the final set of information each individually comprise at least one of the following: training, tips, sales information, routing information, next stop information, remaining stops information, surveys, suggestions for sales/products, new product information, and messages for a delivery driver.

4. The voice controlled apparatus of claim 1, wherein the processor is configured to determine whether the apparatus is in transit to the first location by communicating with one or more sensors configured to determine at least one of a presence of the apparatus in the delivery vehicle, an acceleration of the apparatus, or a current location of the apparatus.

5. The voice controlled apparatus of claim 1, wherein the processor is configured to transform the first voice command into the first text request by converting one or more audio signals to one or more points in data that are stored in a first database.

6. The voice controlled apparatus of claim 1, wherein the processor is configured to transform the second voice command into a second text request by converting one or more audio signals to one or more points in data that are stored in a first database.

7. The voice controlled apparatus of claim 1, wherein the screen lock condition locks the interface to avoid visual display of the validated final set of information in response to the processor determining that the user is in transit to the first location.

8. A method of providing customized information to a user comprising:

receiving a first text request from a user, wherein the first text request is formed by transforming a first voice command into the first text request by converting one or more audio signals to one or more points in data that are stored in a database;

determining whether the user is in transit to a first location;

causing a screen lock condition wherein an interface available to the user is disabled during the screen lock condition;

receiving a first set of information, wherein the first set of information is responsive to the first voice command from the user and is relevant to the first location and is generated as a result of a query comprising at least the first text request that represents the first voice command and the first location;

causing the first set of information to be transmitted to the user;

in response to the provision of the first set of information to the user, receiving a second text request from the user, wherein the second text request is formed by transforming a second voice command into the second text request by converting one or more audio signals to one or more points in data that are stored in a first database, and wherein the second voice command is configured to interact with the first set of information;

processing the second text request to determine a final set of information to transmit to the user, wherein the final set of information is a curated collection of information formed by modifying the first set of information in response to the second voice command such that the final set of information is a subset of the first set of information, and wherein the final set of information comprises offers and pricing information relevant to the first location;

validating the final set of information based on determining that the final set of information comprising the offers and the pricing information is valid on a current date;

analyzing an inventory status of a delivery vehicle while the user is in transit to the first location to determine an optimal distribution point, wherein the optimal distribution point is determined in response to the inventory status indicating that an inventory item is remaining;

determining that the user is not in transit and deactivating the screen lock condition;

causing the validated final set of information to be transmitted to the user via the interface in response to receipt of the second text request after deactivating the screen lock condition; and in response to the inventory status indicating that the inventory item is remaining in the delivery vehicle and in response to the determination of the optimal distribution point, redirecting the user to transit to a second location different the first location, wherein the second location corresponds to the optimal distribution point.

9. The method of claim 8, wherein deactivating the screen lock condition occurs after determining whether the user has arrived at the first location.

10. The method of claim 8, wherein the screen lock condition is activated by locking an interface available to the user to avoid visual display of the validated final set of information in response to determining that the user is in transit to the first location.

11. The method of claim 8, wherein the second voice command is configured to interact with the first set of information by at least one of modifying, accepting, or rejecting at least a portion of the first set of information.

12. The method of claim 8, wherein the first set of information and the final set of information individually comprise at least one of the following: training, tips, sales, routing information, next stop information, remaining stops information, surveys, suggestions for sales/products, new product information, and messages for a delivery driver.

13. The method of claim 8, further comprising processing the first text request with the first location to determine the first set of information configured to be transmitted to the user, wherein the processing:

determines one or more points of interest that relate to the first location by searching the first database or a second database for one or more points in interest relevant to the first text request and the first location; and curates the first set of information by collecting items of information within the one or more points of interest relevant to the first text request and the first location.

14. The method of claim 8, wherein the first voice command is received via a microphone from the user.

15. The method of claim 8, wherein the first set of information is transmitted to the user via a speaker.

16. The method of claim 8, wherein the first set of information is configured to be provided audibly to the user by formatting the first set of information such that it can subsequently be provided to the user by speech.

17. The method of claim 8, further comprising:
transmitting a second set of information to the user based on the second voice command;
receiving a third text request from the user, wherein the third text request is configured to modify, accept, or reject the second set of information; and
processing the third text request to determine the final set of information to transmit to the user, wherein the final set of information is a curated collection of information formed by modifying the first set of information and second set of information in response to the second text request and the third text request.

18. A method of providing customized information to a user comprising:
receiving a first text request from a user device, wherein the first text request is formed by transforming a first voice command into the first text request by converting one or more audio signals to one or more points in data that are stored in a database and wherein the user device is in a screen lock condition;
processing the first text request to determine a first set of information configured to transmit to the user device by:
determining a first location in which the user device is in transit to;
determining one or more points of interest that relate to the first location and the first text request; and
curating the first set of information based on the one or more points of interest that relate to the first location by collecting items of information within the one or more points of interest relevant to the first location and the first text request;
transmitting the first set of information to the user device, where the first set of information is provided audibly to the user while the user device is in the screen lock condition;
in response to the provision of the first set of information to the user, receiving a second text request from the user device via a second voice command, wherein the second text request is configured to interact with the first set of information;
processing the second text request to determine a final set of information to transmit to the user device, wherein the final set of information is a curated collection of information formed by modifying the first set of information in response to the second voice command such that the final set of information is a subset of the first set of information, and wherein the final set of information comprises offers and pricing information relevant to the first location;
validating the final set of information based on determining that the final set of information comprising the offers and the pricing information is valid on a current date;
analyzing an inventory status of a delivery vehicle while the user is in transit to the first location to determine an optimal distribution point, wherein the optimal distribution point is determined in response to the inventory status indicating that an inventory item is remaining;
transmitting the validated final set of information to the user device, wherein the validated final set of information is visually displayed on an interface when the user device is not in the screen lock condition present; and
in response to the inventory status indicating that the inventory item is remaining in the delivery vehicle and in response to the determination of the optimal distribution point, redirecting the user to transit to a second location different the first location, wherein the second location corresponds to the optimal distribution point.

19. The method of claim 18, wherein the second voice command is configured to interact with the first set of information by at least one of modifying, accepting, or rejecting at least a portion of the first set of information.

20. The method of claim 18, wherein the one or more points of interest comprises at least one of the following: training, sales information, routing information, next stop information, remaining stops information, surveys, suggestions for sales/products, new product information, and messages for a delivery driver.

* * * * *